US012102916B2

(12) United States Patent
Hu et al.

(10) Patent No.: US 12,102,916 B2
(45) Date of Patent: Oct. 1, 2024

(54) ABILITY AIMING METHOD AND APPARATUS IN THREE-DIMENSIONAL VIRTUAL ENVIRONMENT, DEVICE, AND STORAGE MEDIUM

(71) Applicant: Tencent Technology (Shenzhen) Company Limited, Shenzhen (CN)

(72) Inventors: Xun Hu, Shenzhen (CN); Yulin Wan, Shenzhen (CN); Shandong Su, Shenzhen (CN); Yu Chen, Shenzhen (CN); Le Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 415 days.

(21) Appl. No.: 17/511,396

(22) Filed: Oct. 26, 2021

(65) Prior Publication Data
US 2022/0047946 A1 Feb. 17, 2022

Related U.S. Application Data

(63) Continuation of application No. PCT/CN2020/128772, filed on Nov. 13, 2020.

(30) Foreign Application Priority Data

Feb. 14, 2020 (CN) .......................... 202010093196.9

(51) Int. Cl.
*A63F 9/24* (2006.01)
*A63F 13/2145* (2014.01)
(Continued)

(52) U.S. Cl.
CPC ........ *A63F 13/533* (2014.09); *A63F 13/2145* (2014.09); *A63F 13/5372* (2014.09)

(58) Field of Classification Search
CPC ...... A63F 13/837; A63F 13/426; A63F 13/52; A63F 13/537; A63F 13/533; A63F 13/53;
(Continued)

(56) References Cited

U.S. PATENT DOCUMENTS 9,937,415 B1 4/2018 Makuch et al.
10,664,983 B2 * 5/2020 Lee .......................... G06V 40/28
(Continued)

FOREIGN PATENT DOCUMENTS

CN 104898953 A 9/2015
CN 105148517 A 12/2015
(Continued)

OTHER PUBLICATIONS

Michael Crider, "Why Are MOBA Games like League of Legends So Popular?", Nov. 6, 2017, howtogeek.com, <https://www.howtogeek.com/331389/why-are-moba-games-like-league-of-legends-so-popular/> (Year: 2017).*

(Continued)

*Primary Examiner* — Justin L Myhr
(74) *Attorney, Agent, or Firm* — Morgan, Lewis & Bockius LLP

(57) ABSTRACT

This application discloses an ability aiming method in a three-dimensional virtual environment performed at a computer device. The method includes: displaying a user interface (UI) of an application program, the UI including a virtual environment picture obtained by observing the three-dimensional virtual environment from the perspective of a third-person point of view; receiving a drag operation on an ability aiming control in the UI, the drag operation from a first operating point and a second operating point that are located on the ability aiming control, the first operating point being an initial operating point and the second operating point being a current operating point of the drag operation;

(Continued)

and displaying a three-dimensional ability aiming indicator in the virtual environment picture in response to the drag operation, an ability aiming direction of the three-dimensional ability aiming indicator being parallel to a drag direction of the drag operation in the UI.

20 Claims, 17 Drawing Sheets

(51) Int. Cl.
*A63F 13/533* (2014.01)
*A63F 13/5372* (2014.01)

(58) Field of Classification Search
CPC .............. A63F 13/5372; A63F 13/573; A63F 2300/8076; A63F 13/422; A63F 2300/308; A63F 13/5258; A63F 13/5375; A63F 13/219; A63F 2300/30
See application file for complete search history.

(56) References Cited

U.S. PATENT DOCUMENTS

| | | | |
|---|---|---|---|
| 2006/0111182 A1 | 5/2006 | Nakanishi et al. | |
| 2015/0121301 A1* | 4/2015 | Wang | G06F 3/0488 715/781 |
| 2015/0157932 A1* | 6/2015 | Kwon | G06Q 50/00 463/31 |
| 2016/0196029 A1* | 7/2016 | Oh | A63F 13/46 463/31 |
| 2017/0340959 A1 | 11/2017 | Tang et al. | |
| 2018/0024660 A1 | 1/2018 | Wang | |
| 2018/0318705 A1* | 11/2018 | Moberg | G06F 3/04883 |
| 2018/0339229 A1 | 11/2018 | He | |
| 2019/0026931 A1* | 1/2019 | Short | G06F 18/24 |
| 2019/0388786 A1 | 12/2019 | D'angelo et al. | |

FOREIGN PATENT DOCUMENTS

| | | |
|---|---|---|
| CN | 105194873 A | 12/2015 |
| CN | 105335065 A | 2/2016 |
| CN | 107967096 A | 4/2018 |
| CN | 108376424 A | 8/2018 |
| CN | 110613933 A | 12/2019 |
| CN | 111282266 A | 6/2020 |
| EP | 3345665 A1 | 11/2017 |
| EP | 3939680 A4 | 6/2022 |
| JP | 2006141723 A | 6/2006 |
| JP | 2018023686 A | 2/2018 |
| JP | 2018517449 A | 7/2018 |
| JP | 2018518997 A | 7/2018 |

OTHER PUBLICATIONS

"[Mobile Legends] Cheats for Intermediate Players", Torobro, Aug. 23, 2019, 9 pgs., Retrieved from the Internet: http://trokiss-gamer.com/smartphonee-game/no-224/.
Tencent Technology, Japanese Office Action, JP Patent Application No. 2021-566187, Jun. 13, 2023, 10 pgs.
Tencent Technology, WO, PCT/CN2020/128772, Jan. 26, 2021, 5 pgs.
Tencent Technology, IPRP, PCT/CN2020/128772, Aug. 11, 2022, 6 pgs.
Tencent Technology, Indonesian Office Action, Indonesian Patent Application No. P00202108818, Oct. 30, 2023, 5 pgs.
Tencent Technology, AU Office Action, Australian Patent Application No. 2020428058, Mar. 6, 2023, 4 pgs.
Daryl Tan, "Inverse Projection Transformation", Dec. 15, 2019, 10 pgs., Retrieved from the Internet: https://towardsdatascience.com/inverse-projection-transformation-c866ccedeflc.
Tencent Technology, CA Office Action, Canadian Patent Application No. 3,136,380, Dec. 1, 2022, 5 pgs.
Gaming Theos, "Perfect Use of Mini Map | Map Awareness & Farming Guide Mobile Legends Bang Bang", YouTube, Mar. 24, 2019, 3 pgs., Retrieved from the Internet: https://www.youtube.com/watch?v=jq3SrGBhpns.
Tencent Technology, JP Office Action, Japanese Patent Application No. 2021-566187, Dec. 13, 2022, 8 pgs.
Extended European Search Report, EP20918314.4, May 30, 2022, 9 pgs.
Tencent Technology, ISR, PCT/CN2020/128772, Jan. 26, 2021, 2 pgs.
Tencent Technology (Shenzhen) Company Limited, Canadian Office Action, CA 3,136,380, Sep. 20, 2023, 5 pgs.
Tencent Technology Company Limited, Korean Office Action, KR 10-2021-7036125, Sep. 20, 2023, 13 pgs.
Tencent Technology, Singapore Office Action, SG Patent Application No. 11202111792S, May 19, 2023, 12 pgs.
Tencent Technology, AU Office Action, Australian Patent Application No. 2020428058, Sep. 21, 2022, 3 pgs.
Tencent Technology, European Office Action, EP Patent Application No. 20918314.4, Jun. 17, 2024, 5 pgs.

* cited by examiner

ABILITY AIMING METHOD AND APPARATUS IN THREE-DIMENSIONAL VIRTUAL ENVIRONMENT, DEVICE, AND STORAGE MEDIUM

CROSS-REFERENCE TO RELATED APPLICATIONS

This application is a continuation application of PCT Patent Application No. PCT/CN2020/128772, entitled "METHOD AND APPARATUS FOR SKILL AIMING IN THREE-DIMENSIONAL VIRTUAL ENVIRONMENT, DEVICE AND STORAGE MEDIUM" filed on Nov. 13, 2020, which claims priority to Chinese Patent Application No. 202010093196.9, filed with the State Intellectual Property Office of the People's Republic of China on Feb. 14, 2020, and entitled "ABILITY AIMING METHOD AND APPARATUS IN THREE-DIMENSIONAL VIRTUAL ENVIRONMENT, TERMINAL, AND STORAGE MEDIUM", all of which are incorporated herein by reference in their entirety.

FIELD OF THE TECHNOLOGY

This application relates to the field of human-computer interaction, and in particular, to an ability aiming method and apparatus in a three-dimensional virtual environment, a device, and a storage medium.

BACKGROUND OF THE DISCLOSURE

Multiplayer online battle arena (MOBA) a quite popular game form. In this game form, each user controls a selected virtual character by using a user interface (UI).

In the related art, as shown in FIG. 1, a terminal displays a UI 10. The UI 10 includes a virtual environment picture 12 and a wheel control 14. The user performs a drag operation on the wheel control 14, to control an ability casting direction in a three-dimensional virtual environment.

The ability aiming method has relatively poor accuracy during ability aiming, and the human-computer interaction efficiency is relatively low.

SUMMARY

Embodiments of this application provide an ability aiming method and apparatus in a three-dimensional virtual environment, a device, and a storage medium, which may improve the accuracy during ability aiming and improve the human-computer interaction efficiency. The technical solutions are as follows:

According to an aspect of this application, an ability aiming method in a three-dimensional is provided, applicable to a computer device, the method including:
  displaying a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture;
  receiving a drag operation on the ability aiming control, the drag operation including a first operating point and a second operating point that are located on the ability aiming control, the first operating point being an initial operating point of the drag operation, and the second operating point being a current operating point of the drag operation; and
  displaying a three-dimensional ability aiming indicator in the virtual environment picture in response to the drag operation, an ability aiming direction of the three-dimensional ability aiming indicator being parallel to a drag direction of the drag operation in the UI, and the drag direction corresponding to an aiming vector pointing from the first operating point to the second operating point.

According to another aspect of this application, an ability aiming method in a three-dimensional virtual environment is provided, applicable to a computer device configured with or connected to a physical aiming component, the method including:
  displaying a user interface (UI) of an application program, the UI including a virtual environment picture, and the virtual environment picture being a picture obtained by observing the three-dimensional virtual environment from the perspective of a third-person point of view;
  receiving an aiming operation on the physical aiming component, the aiming operation including a first operating position and a second operating position that are triggered on the physical aiming component, the first operating position being an initial operating position of the aiming operation, and the second operating position being a current operating position of the aiming operation; and
  displaying a three-dimensional ability aiming indicator in the virtual environment picture in response to the aiming operation, an ability aiming direction of the three-dimensional ability aiming indicator being parallel to an aiming direction of the aiming operation in the UI, and the aiming direction being a direction pointing from the first operating position to the second operating position.

According to another aspect of this application, a computer device is provided, including a processor and a memory, the memory storing at least one program, the at least one program being loaded and executed by the processor to implement the ability aiming method in a three-dimensional virtual environment according to the foregoing aspect.

According to another aspect of this application, a non-transitory computer-readable storage medium is provided, storing at least one program, the at least one program being loaded and executed by a processor of a computer device to implement the ability aiming method in a three-dimensional virtual environment according to the foregoing aspect.

The technical solutions provided in the embodiments of this application generate at least the following beneficial effects:

By causing an ability aiming direction of a three-dimensional ability aiming indicator in a UI to be parallel to a drag direction of a drag operation, the ability aiming direction observed by a user matches a hand action of the user, thereby improving the accuracy of ability aiming. Unnecessary correction operations are reduced, so that the human-computer interaction efficiency is also improved to some extent.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
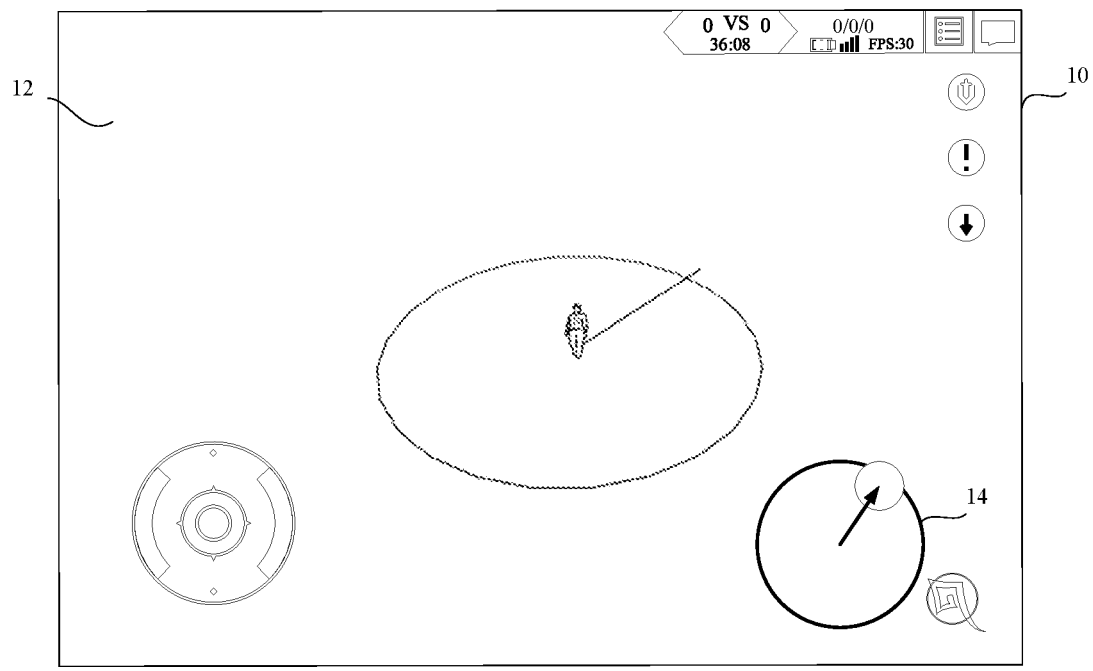
FIG. 1 is a schematic diagram of an interface of an ability aiming method in a three-dimensional virtual environment in the related art.

To make the objectives, technical solutions, and advantages of this application clearer, the following further describes implementations of this application in detail with reference to the accompanying drawings.

First, several terms involved in this application are described.

Three-dimensional virtual environment: a virtual world displayed (or provided) by an application program when run on a terminal. The virtual world may be a simulated environment of a real world, or may be a semi-simulated semi-fictional three-dimensional environment, or may be a completely fictional three-dimensional environment. Optionally, the virtual world is further used for a virtual world battle between at least two virtual characters, and virtual resources available to the at least two virtual characters are provided in the virtual world. Optionally, the virtual world includes a square map. The square map includes a lower left corner region and an upper right corner region that are symmetrical. Virtual roles on two opposing sides occupy the regions respectively, and the objective of each side is to destroy a target building deep in the opponent's region to win victory.

Virtual character: a movable object in the virtual world. The movable object may be at least one of a virtual person, a virtual animal, and a cartoon person. Optionally, when the virtual world is a three-dimensional virtual world, the virtual character may be a three-dimensional model. Each virtual character has a shape and a volume in the three-dimensional virtual world, and occupies some space in the three-dimensional virtual world. Optionally, the virtual character is a three-dimensional character constructed based on three-dimensional human skeleton technology. The virtual character wears different skins to implement different appearances. In some embodiments, the virtual character may be alternatively implemented by using a 2.5-dimensional model or a two-dimensional model. This is not limited in this embodiment of this application.

Multiplayer online battle arena (MOBA): different virtual teams on at least two opposing camps occupy respective map regions on a map provided in a virtual environment, and compete against each other using specific victory conditions as goals. The victory conditions include, but are not limited to at least one of occupying forts or destroy forts of the opposing camps, killing virtual characters in the opposing camps, ensure own survivals in a specified scenario and time, seizing a specific resource, and outscoring the opponent within a specified time. The battle arena game may take place in rounds. The same map or different maps may be used in different rounds of the battle arena game. Each virtual team includes one or more virtual characters, for example, 1 virtual character, 3 virtual characters, or 5 virtual characters.

MOBA game: a game in which several forts are provided in a virtual world, and users on different camps control virtual characters to battle in the virtual world, occupy forts or destroy forts of the opposing camp. For example, in the MOBA game, the users may be divided into two opposing camps. The virtual characters controlled by the users are scattered in the virtual world to compete against each other, and a victory condition is to destroy or occupy all enemy forts. The MOBA game takes place in rounds. A duration of a round of the MOBA game is from a time point at which the game starts to a time point at which the victory condition is met.

Virtual environment picture: a picture obtained by observing a three-dimensional virtual environment from the perspective of a third-person point of view. Optionally, the quarter view is a 45-degree angle. A virtual camera is generally disposed in a game scene, and game scene content photographed by the virtual camera is a virtual environment picture presented by a user interface (UI). In a third-person viewing angle 3D game, the virtual camera may photograph game scene content including virtual characters, and display the virtual characters on the virtual environment picture. In another example, in some games without virtual characters, movement and rotation of the virtual camera may be directly controlled, to update a game picture presented by the UI.

Ability: a character capability owned by a virtual character in the three-dimensional virtual environment, which may generate an effect on virtual characters of other camps. The ability may be an attack ability, a defensive ability, an ability having a specific target, a group attack ability, an ability that generates a flying effect on virtual characters of other camps, or an ability that generates a slowdown effect on virtual characters of other camps, which is not limited in this application.

Targeted ability: a character capability that is targeted and owned by a virtual character in the three-dimensional virtual environment. The ability may be an ability that generates an effect on a single virtual character of other camps or may be an ability that generates an effect on a plurality of virtual characters of other camps. The ability may be alternatively classified into any one of a fan-shaped targeted ability, a linear targeted ability, a circular targeted ability, and a dot targeted ability according to different aiming manners.

In terms of a presentation form, the targeted ability may be an ability that a virtual character holding a prop to directly attack virtual characters of other camps, such as setting first for burning, and a position attacked by the virtual character differs according to different pointed positions. The targeted ability may be alternatively an ability that a virtual character throws out a prop in hands to generate a slowdown effect or attack effect on virtual characters of other camps encountered by the prop. The targeted ability may generate effects on different virtual characters of an opposing camp according to different directions in which the virtual character throws out the prop. The targeted ability may be alternatively casting a spell to a specified direction by the virtual character holding a prop, and the spell may be freezing, burning, slowing down, or attacking. A position to which the virtual character casts the spell differs according to different aimed positions.

Ability aiming control: a two-dimensional control that is located on an upper layer of the virtual environment picture and configured to cast an ability. For example, the ability aiming control is a wheel aiming control. The wheel aiming control includes an inner ring and an outer ring. The inner ring may be dragged by a user, and the outer ring is fixed. When the user performs a drag operation, the inner ring may generate a displacement. When the displacement of the inner ring is within a range of a dead region, ability aiming may not be triggered. When the displacement of the inner ring exceeds the range of the dead region, ability aiming is started and triggered. When the displacement of the inner ring exceeds the outer ring, casting of an ability is canceled. For example, the user may cast an ability by touching a wheel aiming control in a screen of a terminal on which an application program is installed, and the terminal may be a touchable terminal such as a mobile phone or a tablet computer.

Physical aiming component: a device that is connected to the terminal and configured to capture a trajectory of an action of a hand or another limb of a user. For example, the physical aiming component includes a physical button or joystick. For example, the physical aiming component includes a game joystick with an acceleration sensor. For example, the physical aiming component includes one or more cameras with a space perception capability.

Three-dimensional ability aiming indicator: an indicator that is used for indicating an ability aiming direction and distance before a targeted ability is cast in the three-dimensional virtual environment. An ability direction of the three-dimensional ability aiming indicator is changeable and is determined according to an aiming direction when the user operates the ability aiming control. An ability distance of the three-dimensional ability aiming indicator may be dynamically determined according to a distance of a drag operation performed by the user on the ability aiming control or may be fixed, which is automatically set by the application program. In terms of a presentation form, the three-dimensional ability aiming indicator may be an indicator that is displayed on the ground of the three-dimensional virtual environment, a height of a chest of a virtual character or another height position parallel to the ground in the three-dimensional virtual environment, a position pointing from a virtual character to the ground in the three-dimensional virtual environment, or a position pointing from a virtual character to another height in the three-dimensional virtual environment and is used for indicating an ability direction and distance.

Drag direction: a direction in which the user performs a drag operation on the ability aiming control. The drag operation performed by the user on the ability aiming control may be dragging or may be another touch operation that causes the ability aiming control to move. An initial operating point of the drag operation is referred to as a first operating point, and a current operating point of the drag operation is referred to as a second operating point. The direction of the drag operation performed by the user is a direction pointing from the first operating point to the second operating point.

Aiming direction: a direction in which the user performs an aiming operation on the physical aiming component. The aiming operation performed by the user on the physical aiming component may be long pressing or may be another press operation that causes the physical aiming component to move. An initial operating position of the aiming operation is referred to as a first operating position, and a current operating position of the aiming operation is referred to as a second operating position. The aiming direction of the aiming operation performed by the user is a direction pointing from the first operating position to the second operating position.

Ability direction: a direction at which an ability of the virtual character aims in the three-dimensional virtual environment. The ability direction and the ability aiming direction are different, the ability direction is a direction at which an ability of the virtual character aims in the three-dimensional virtual environment and calculated by the application program, the ability aiming direction is an ability aiming direction displayed on the three-dimensional ability aiming indicator on the virtual environment picture, and the virtual environment picture is a picture obtained by observing the three-dimensional virtual environment from the perspective of a third-person point of view (45-degree angle). For example, the ability direction in a picture obtained by observing a virtual environment from the perspective of a third-person point of view (90-degree angle) and the ability aiming direction in the picture obtained by observing the three-dimensional virtual environment from the perspective of a third-person point of view (45-degree angle) are different, and there is a certain deviation.

Ability aiming direction: an ability aiming direction displayed on the three-dimensional ability aiming indicator on the virtual environment picture. For example, the ability aiming direction is an ability aiming direction of the virtual character displayed in the UI and is different from the ability direction of the virtual character in the three-dimensional virtual environment. For example, the ability aiming direction is parallel to the drag direction of the drag operation. For example, the ability aiming direction is parallel to the aiming direction of the aiming operation.

Dead region: ability aiming is only started and triggered when a distance between the first operating point and the second operating point is greater than a fixed value. For example, ability aiming may not be triggered when the distance between the first operating point and the second operating point is less than the fixed value. A region using the first operating point as a center of a circle and the fixed value as a radius is referred to as a dead region.

In a typical MOBA game, the drag direction of the user is consistent with the direction in which the virtual character casts an ability in the three-dimensional virtual environment. However, on the UI, the ability aiming direction of the three-dimensional ability aiming indicator displayed in the virtual environment picture after conversion from the perspective of the third-person point of view may generate a certain deviation with the drag direction on the ability aiming control. The deviation may increase the game difficulty of the user in a game process to some extent. Even when the deviation is found and the user intends to change the drag direction by adjusting a position of a finger to cause the ability aiming direction of the three-dimensional ability aiming indicator finally displayed in the UI to be a direction the user intends to reach, it is quite difficult for a user using a small-screen mobile phone to operate, and the user cannot accurately control an angle of the drag direction that needs to be adjusted by the user. Therefore, the ability aiming direction and the drag direction generate a deviation, the accuracy of ability aiming is reduced, and the human-computer interaction efficiency is also reduced.

An embodiment of this application provides an ability aiming method in a three-dimensional virtual environment, to cause the ability aiming direction displayed in the virtual environment picture to be consistent with the drag direction of the user, thereby improving the accuracy of ability aiming, and also improving the human-computer interaction efficiency.

In addition, in the ability aiming method in a three-dimensional virtual environment provided in this embodiment of this application, a cast distance of the virtual character, namely, a distance of the three-dimensional ability aiming indicator may be fixed or may be dynamically determined according to a distance by which the ability aiming control is dragged by the user, thereby improving the human-computer interaction efficiency.

Figure 2:
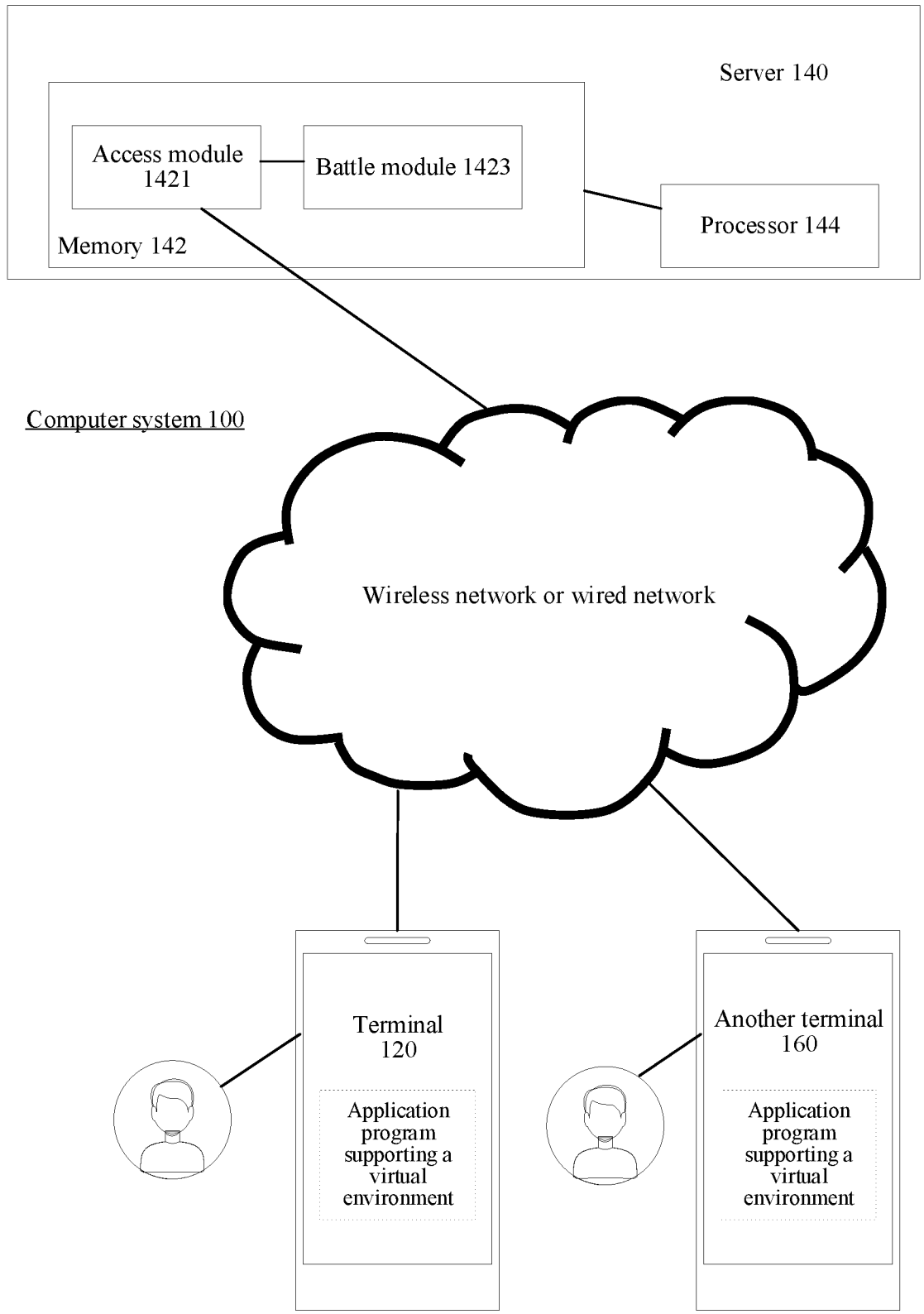
FIG. 2 is a structural block diagram of a computer system according to an exemplary embodiment of this application.

FIG. 2 is a structural block diagram of a computer system according to an exemplary embodiment of this application. The computer system 200 includes a terminal 220, a server 240, and another terminal 260.

An application program supporting a virtual environment is installed and run on the terminal 220. The application program may be any one of a virtual reality (VR) application program, a three-dimensional map program, a military simulation program, a first-person shooting (FPS) game, a MOBA game, and a multiplayer gunfight survival game. In this embodiment, an example in which the application program is a MOBA game is used for description. The terminal 220 is a terminal used by a user. The user uses the terminal 220 to control a virtual character in a virtual environment to perform activities. The activities include, but are not limited to, at least one of body posture adjustment, crawling, walking, running, cycling, jumping, driving, shooting, throwing, using a virtual weapon to attack another virtual character, and using a virtual weapon to attack another virtual character through a charged attack. For example, the virtual character is a virtual figure, such as a simulated figure object or a cartoon figure object. For example, the virtual character is a virtual animal, such as a simulated animal character or a cartoon animal character. For example, the virtual character is a virtual plant, such as a simulated plant character or a cartoon plant character.

The terminal 220 is connected to the server 240 by using a wireless network or a wired network.

The server 240 includes at least one of one server, a plurality of servers, a cloud computing platform, and a virtualization center. For example, the server 240 includes a processor 244 and a memory 242. The memory 242 includes an access module 2421 and a battle module 2423. The server 240 is configured to provide backend services for an application program supporting a three-dimensional virtual environment. Optionally, the server 240 takes on primary computing work, and the terminal 220 takes on secondary computing work; alternatively, the server 240 takes on secondary computing work, and the terminal 220 takes on primary computing work; alternatively, collaborative computing is performed by using a distributed computing architecture between the server 240 and the terminal 220.

Optionally, there are further one or more another terminals 260, namely, terminals corresponding to a developer. A platform for developing and editing the application program supporting the virtual environment is installed on the another terminal 260. The developer can edit and update the application program on the another terminal 260 and transmit an updated application program installation package to the server 240 through a wired or wireless network. The terminal 220 can download the application program installation package from the server 240 to update the application program.

The another terminal 260 is connected to the server 240 by using a wireless network or a wired network.

Optionally, the application program installed on the terminal 220 is an application program of an Android/iOS control system platform. The terminal 220 may generally refer to one of a plurality of terminals. In this embodiment, only the terminal 220 and the another terminal 260 are used as an example for description. The terminal 220 and the another terminal 260 are of the same device type or of different device types. The device type includes at least one of an augmented reality (AR) device, a VR device, a smart wearable device, a smartphone, a tablet computer, an e-book reader, a Moving Picture Experts Group Audio Layer III (MP3) player, a Moving Picture Experts Group Audio Layer IV (MP4) player, a laptop portable computer, and a desktop computer. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this application.

Figure 3:
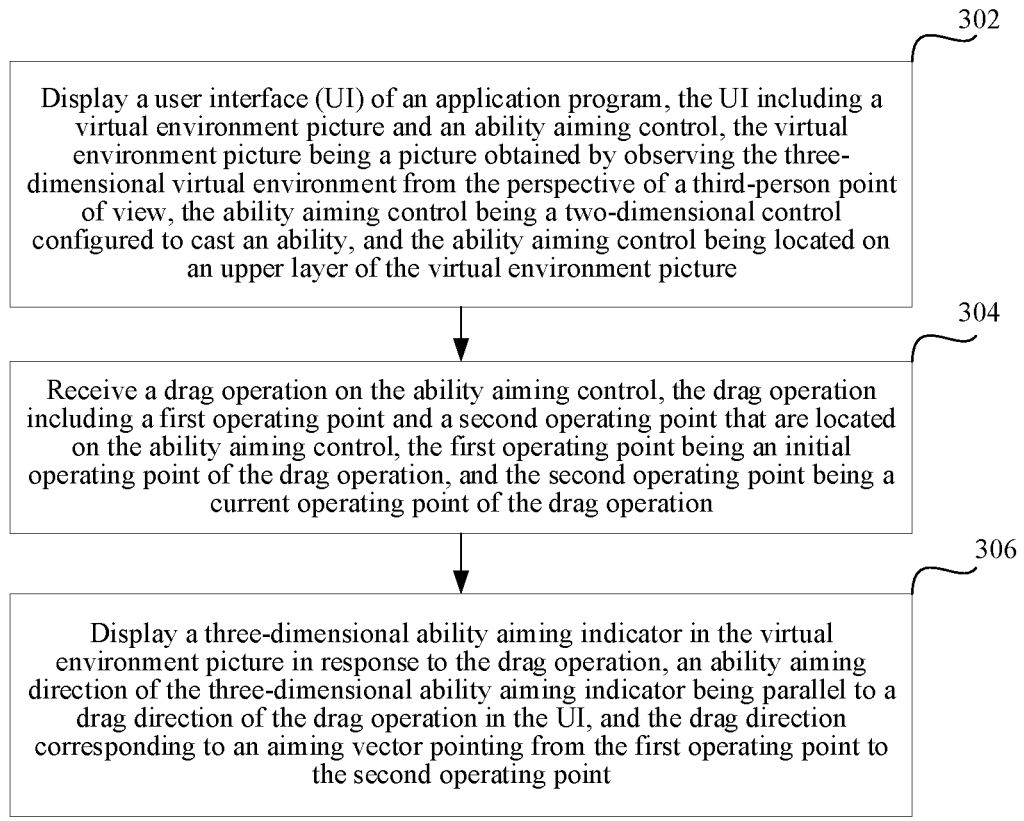
FIG. 3 is a flowchart of an ability aiming method in a three-dimensional virtual environment according to an exemplary embodiment of this application.

FIG. 3 is a flowchart of an ability aiming method in a three-dimensional virtual environment according to an exemplary embodiment of this application. The method may be performed by a computer device, and the computer device may be a terminal, a server, or a terminal and a server, where the terminal may be the terminal 220 in FIG. 2 and the server may be the server 240 in FIG. 2. An example in which the method is performed by a terminal is used, and the method includes:

Step 302: Display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture.

After a round of battle is started by a user, the terminal displays a UI. For example, when the application program is a game program of a MOBA type, the battle is a 1V1 battle, a 5V5 battle, a ranking battle, a matching battle, or a human-computer battle.

For example, the UI includes two parts of content: a virtual environment picture and a head-up display (HUD) region. The virtual environment picture is a picture obtained by a virtual camera acquiring elements in the three-dimensional virtual environment, and the HUD region includes one or more UI elements superimposed on the virtual environment picture.

Optionally, the virtual environment picture is a picture obtained by observing the three-dimensional virtual environment from the perspective of a third-person point of view. A virtual camera is generally disposed in a game scene, and game scene content photographed by the virtual camera is a game picture presented by the UI. In a third-person 3D game, a virtual object in the three-dimensional virtual environment may be observed from different angles by using the virtual camera. Optionally, the virtual camera may not be actually displayed in the virtual environment picture displayed by the application program. The virtual camera may photograph game scene content including virtual characters, and the virtual characters are displayed on the UI. In another example, in some games without virtual characters, movement and rotation of the virtual camera may be directly controlled, to update a game picture presented by the UI.

Optionally, the virtual environment displayed by the virtual environment picture includes at least one of the following elements: a mountain, a plain, a river, a lake, a sea, a desert, swamp, quicksand, sky, a plant, a building, a vehicle, and a character.

For example, when the virtual character moves or rotates, the virtual environment picture changes accordingly. The virtual character may be in the virtual environment picture or may be not in the virtual environment picture.

Optionally, the HUD region includes: information display elements used for displaying information and control function elements used for human-computer interaction. For example, the information display elements include: elements used for displaying information such as a friend information region, a scoreboard, a device information region, and virtual character score region. For example, the control function elements include: elements used for human-computer interaction such as a signal control, a chatting control, a coin region, recommended equipment, an ability control of the virtual character, an attack function control of the virtual character, a summoner ability control, a heal ability control, a town portal ability control, and an ability aiming control.

In the embodiments of this application, the HUD region includes an ability aiming control, and the ability aiming control is a two-dimensional control configured to cast a targeted ability. That is, in a process of casting the targeted ability, the user needs to use the ability aiming control to perform ability aiming. The user may drag the ability aiming control displayed on a screen of the terminal through a touch operation.

Figure 4:
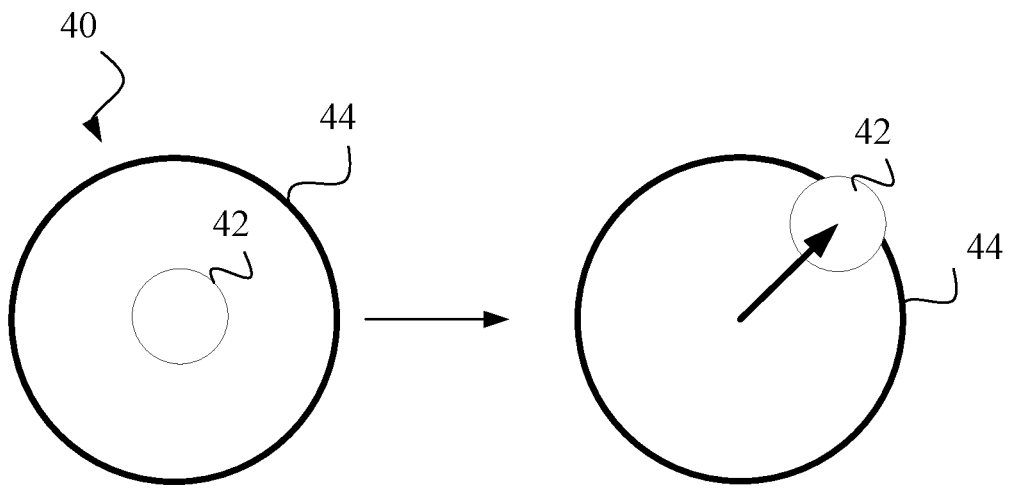
FIG. 4 is a schematic diagram of an interface of an ability aiming method in a three-dimensional virtual environment according to another exemplary embodiment of this application.

For example, the ability aiming control is a wheel aiming control. As shown in FIG. 4, the wheel aiming control includes an inner ring 42 and an outer ring 44. The inner ring 42 may be dragged, and the outer ring is fixed or relatively fixed. When the inner ring 42 is dragged within the outer ring 44, the operation is considered as a valid operation; and when the inner ring 42 is dragged to the outside of the outer ring 44, the operation is considered as an invalid operation or a cast canceling operation.

The terminal is a device provided with a touch screen, such as a smartphone, a game console, or a tablet computer.

Step 304: Receive a drag operation on the ability aiming control, the drag operation including a first operating point and a second operating point that are located on the ability aiming control, the first operating point being an initial operating point of the drag operation, and the second operating point being a current operating point of the drag operation.

The terminal receives a drag operation on the ability aiming control.

For example, the drag operation performed by the user on the ability aiming control may be an operation that presses the inner ring 42 first and drags the inner ring toward a certain direction, or may be another operation such as click, touch, slide that can cause the ability aiming control to generate a certain displacement.

In the embodiments of this application, the operating point refers to a point of a touch point of the drag operation mapped on the ability aiming control.

In a possible implementation, in response to that the touch point of the drag operation is located within a coverage range of the ability aiming control, the current operating point coincides with a current touch point of the touch operation.

In a possible implementation, in response to that the touch point of the drag operation is located outside the coverage range of the ability aiming control, the current operating point is an intersection point of a connecting line between a center point of the ability aiming control and the current touch point of the touch operation and the outer ring of the ability aiming control. Alternatively, in response to that the touch point of the drag operation is located outside the coverage range of the ability aiming control, the current operating point is an intersection point of a connecting line between an initial touch point of the drag operation and the current touch point of the touch operation and the outer ring of the ability aiming control.

Step 306: Display a three-dimensional ability aiming indicator in the virtual environment picture in response to the drag operation, an ability aiming direction of the three-dimensional ability aiming indicator being parallel to a drag direction of the drag operation in the UI, and the drag direction corresponding to an aiming vector pointing from the first operating point to the second operating point.

The three-dimensional ability aiming indicator is used for indicating an ability direction and distance of a virtual character in the virtual environment picture. According to different targeted abilities, the three-dimensional ability aiming indicator may be a unidirectional single-arrow aiming indicator, a unidirectional multi-arrow aiming indicator, a fan-shaped aiming indicator, a circular aiming indicator, or an indicator of another shape and used for indicating an ability direction (and a distance) of a virtual character.

Figure 5:
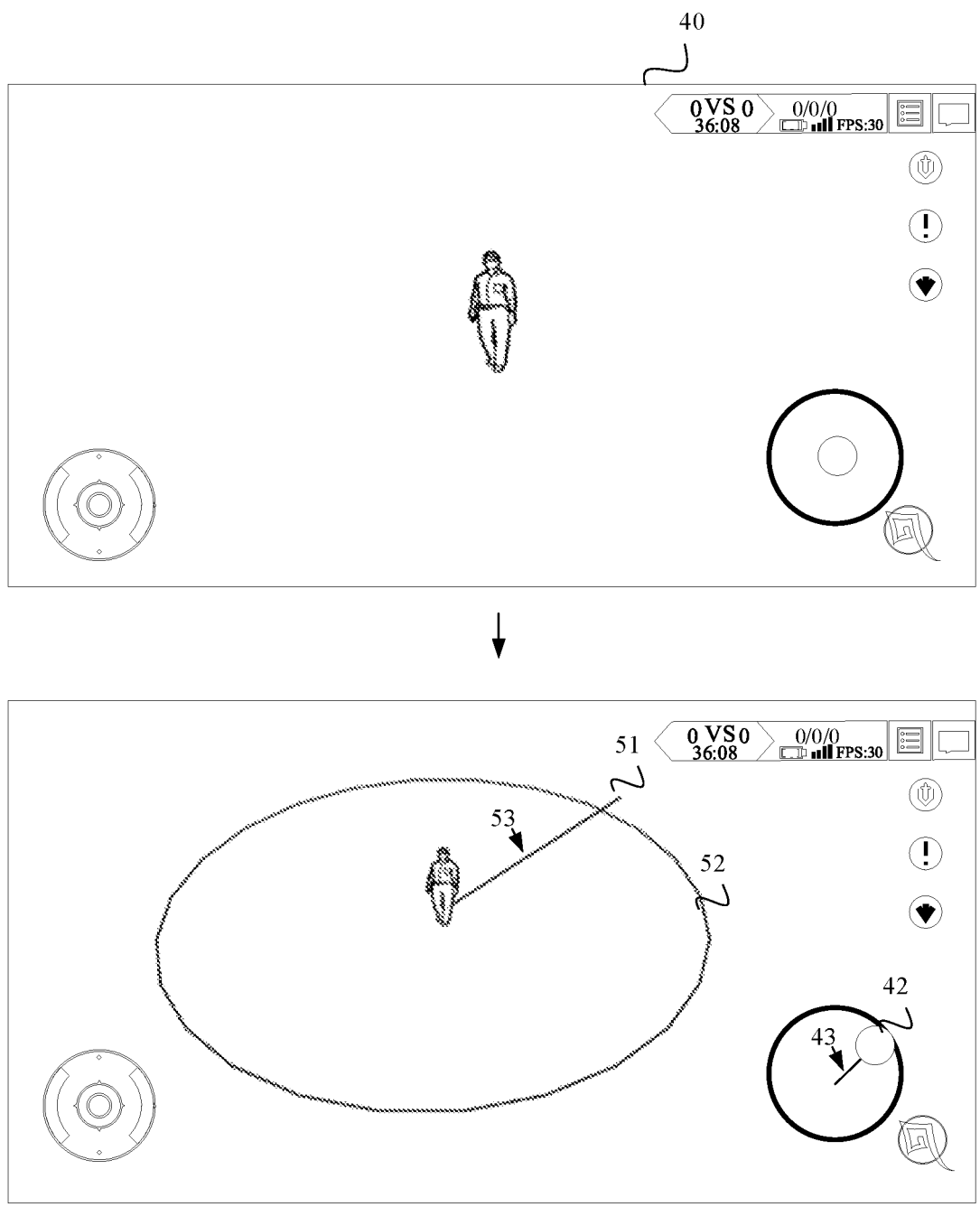
FIG. 5 is a schematic diagram of an interface of an ability aiming method in a three-dimensional virtual environment according to another exemplary embodiment of this application.

As shown in FIG. 5, the terminal displays a UI 40, and after the user performs a drag operation on the inner ring 42 of the ability aiming control, a unidirectional single-arrow aiming indicator may be displayed under the feet of the virtual character in the UI 40. The unidirectional single-arrow aiming indicator includes: an arrow aiming line 51 and a maximum cast distance 52. In the virtual environment picture, the arrow aiming line 51 includes an ability aiming direction 53; and in the HUD region, the first operating point before dragging and the second operating point after dragging form a drag direction 43 in the inner ring 42. In the entire UI, the ability aiming direction 53 and the drag direction 43 are parallel to each other.

Figure 6:
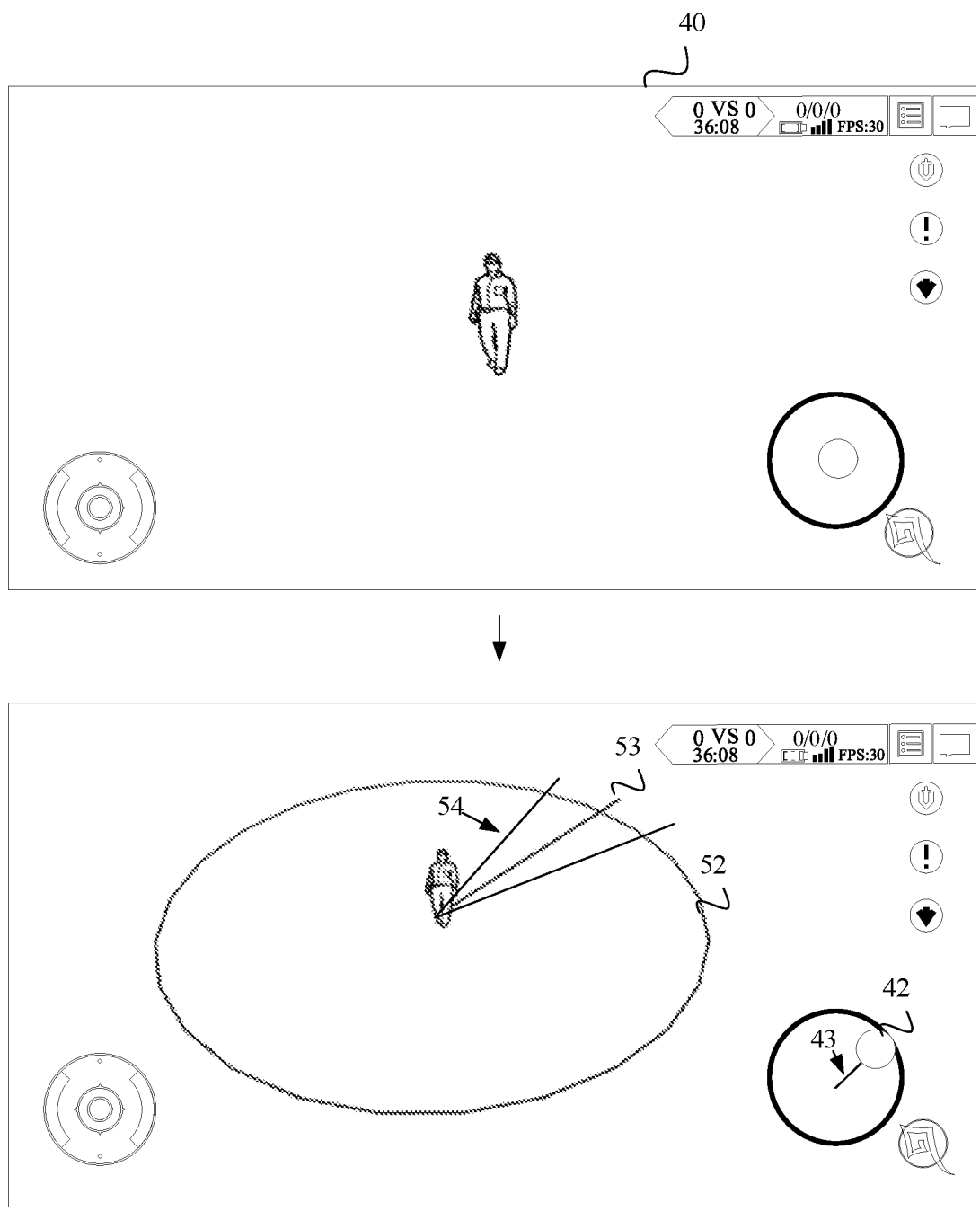
FIG. 6 is a schematic diagram of an interface of an ability aiming method in a three-dimensional virtual environment according to another exemplary embodiment of this application.

As shown in FIG. 6, the terminal displays a UI 40, and after the user performs a drag operation on the inner ring 42 of the ability aiming control, a unidirectional multi-arrow aiming indicator may be displayed under the feet of the virtual character in the UI 40. The unidirectional multi-arrow aiming indicator includes: three arrow aiming lines 54 and a maximum cast distance 52. In the virtual environment picture, the three arrow aiming lines 54 include an ability aiming direction 53; and in the HUD region, the first operating point before dragging and the second operating point after dragging form a drag direction 43 in the inner ring 42. In the entire UI, the ability aiming direction 53 and the drag direction 43 are parallel to each other.

Figure 7:
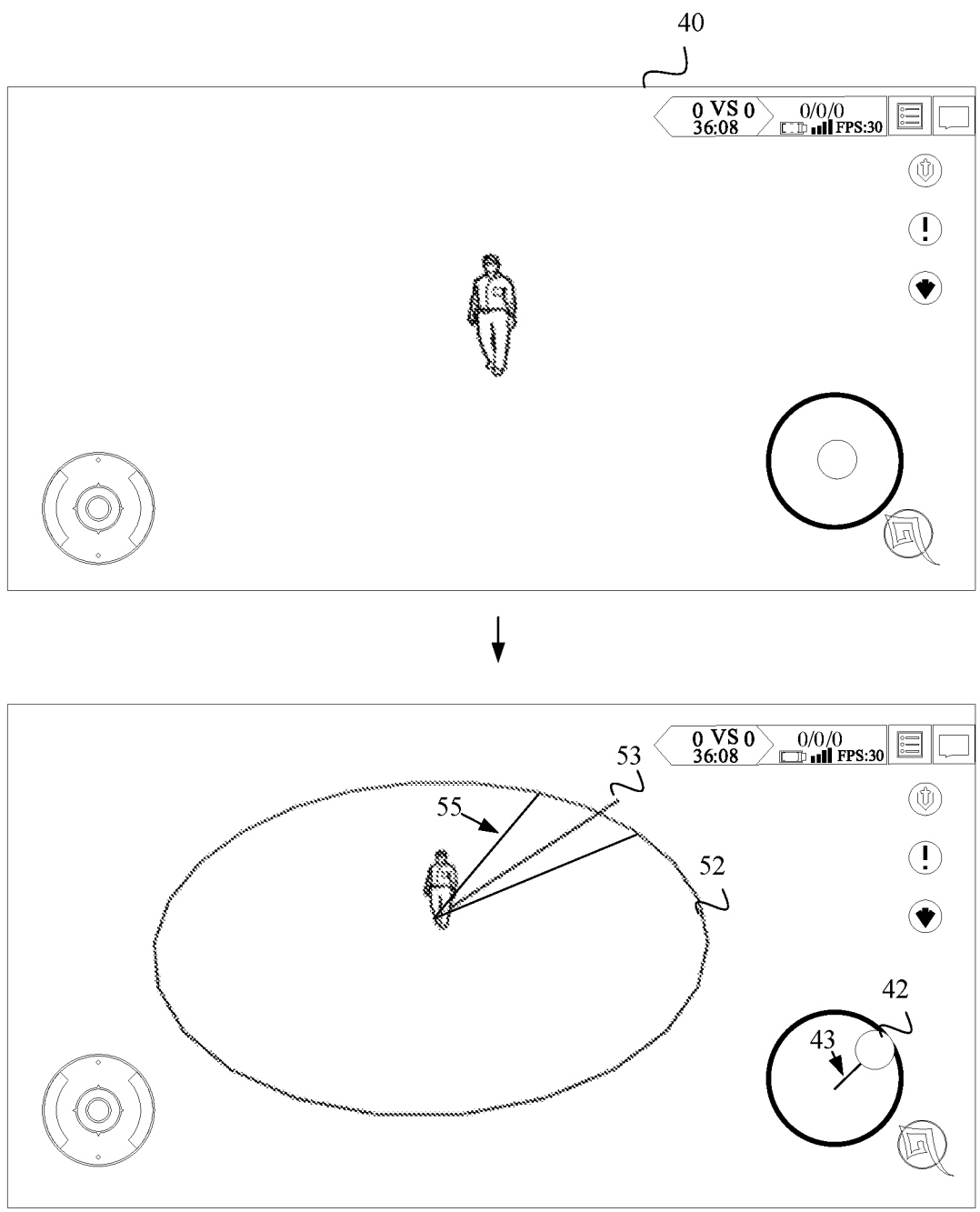
FIG. 7 is a schematic diagram of an interface of an ability aiming method in a three-dimensional virtual environment according to another exemplary embodiment of this application.

As shown in FIG. 7, the terminal displays a UI 40, and after the user performs a drag operation on the inner ring 42 of the ability aiming control, a fan-shaped aiming indicator may be displayed under the feet of the virtual character in the UI 40. The fan-shaped aiming indicator includes: a fan-shaped aiming region 55 and a maximum cast distance 52. In the virtual environment picture, the fan-shaped aiming region 55 includes an ability aiming direction 53; and in the HUD region, the first operating point before dragging and the second operating point after dragging form a drag direction 43 in the inner ring 42. In the entire UI, the ability aiming direction 53 and the drag direction 43 are parallel to each other.

Figure 8:
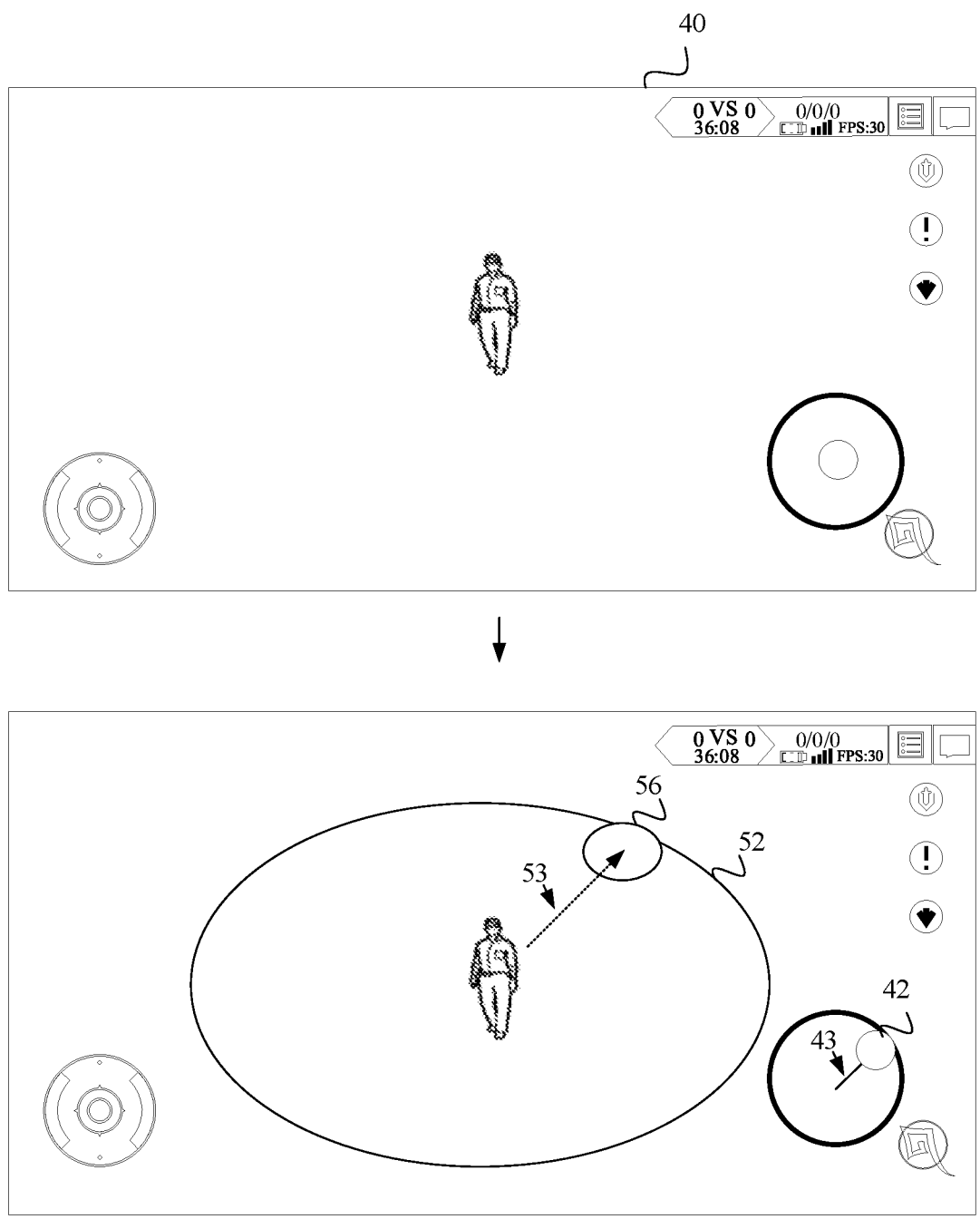
FIG. 8 is a schematic diagram of an interface of an ability aiming method in a three-dimensional virtual environment according to another exemplary embodiment of this application.

As shown in FIG. 8, the terminal displays a UI 40, and after the user performs a drag operation on the inner ring 42 of the ability aiming control, a fan-shaped aiming indicator may be displayed under the feet of the virtual character in the UI 40. The fan-shaped aiming indicator includes: a circular aiming region 56 and a maximum cast distance 52. In the virtual environment picture, the fan-shaped aiming region 56 includes an ability aiming direction 53; and in the HUD region, the first operating point before dragging and the second operating point after dragging form a drag direction 43 in the inner ring 42. In the entire UI, the ability aiming direction 53 and the drag direction 43 are parallel to each other.

The ability aiming direction 53 may be not explicitly displayed. When the ability aiming direction 53 is not displayed, the ability aiming direction 53 may be determined according to a foothold of the virtual character and a center point of an actual functioned region after an ability is cast.

The drag direction 43 may be also not explicitly displayed. When the drag direction 43 is not displayed, the drag direction 43 may be determined according to the first operating point before dragging and the second operating point after dragging in the inner ring 42.

The foregoing is described by using only an example in which the ability aiming control is a wheel aiming control, and the form of the ability aiming control is not limited in this embodiment provided that the function of ability aiming may be implemented.

Based on the above, according to the method provided in this embodiment, by causing an ability aiming direction of a three-dimensional ability aiming indicator in a UI to be parallel to a drag direction of a drag operation, the ability aiming direction observed by a user matches a hand action of the user, thereby improving the accuracy of ability aiming. Unnecessary correction operations are reduced, so that the human-computer interaction efficiency is also improved to some extent.

Figure 9:
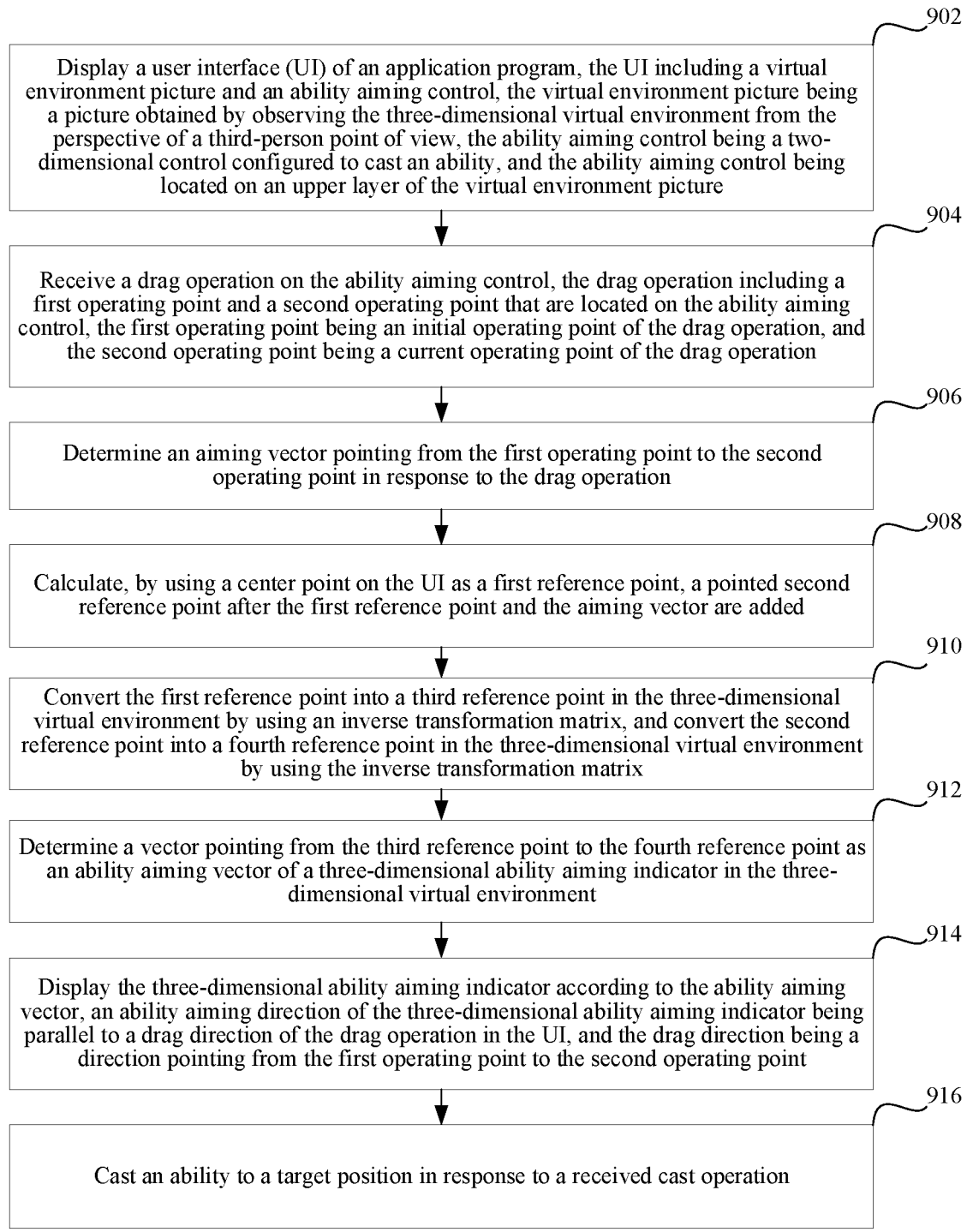
FIG. 9 is a flowchart of an ability aiming method in a three-dimensional virtual environment according to another exemplary embodiment of this application.

FIG. 9 is a flowchart of an ability aiming method in a three-dimensional virtual environment according to another exemplary embodiment of this application. The method may be performed by a computer device, and the computer device may be a terminal, a server, or a terminal and a server, where the terminal may be the terminal 220 in FIG. 2 and the server may be the server 240 in FIG. 2. An example in which the method is performed by a terminal is used, and the method includes:

Step 902: Display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture.

The terminal displays a UI of an application program, the UI includes a virtual environment picture and an HUD region, and the ability aiming control is an element of the HUD region. The HUD region is located on the upper layer of the virtual environment picture and does not change along with changes of the three-dimensional virtual environment.

The ability aiming control is a two-dimensional control that is located on an upper layer of the virtual environment picture and configured to cast an ability, and is formed by an inner ring and an outer ring together. The user may drag the inner ring, but a center of the inner ring cannot exceed a region of the outer ring. In addition, ability aiming can be only triggered when a distance of a drag operation of the user is greater than a radius of a dead region. Ability aiming cannot be triggered when the distance of the drag operation of the user is less than the radius of the dead region.

Figure 10:
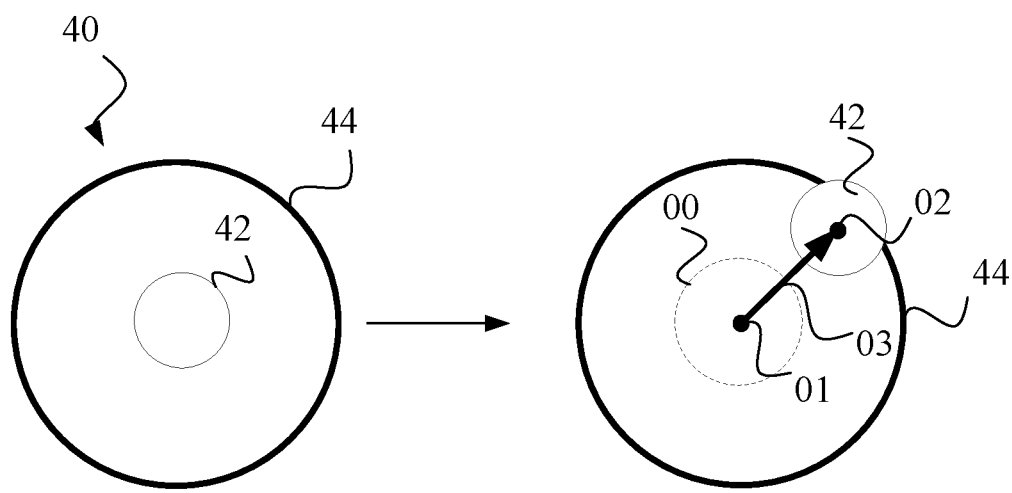
FIG. 10 is a schematic diagram of an interface of an ability aiming method in a three-dimensional virtual environment according to another exemplary embodiment of this application.

As shown in FIG. 10, an ability aiming control 40 is formed by an inner ring 42 and an outer ring 44 together. A dead region 00 exists between the inner ring 42 and the outer ring, and the dead region 00 is slightly greater than the inner ring 42. In a possible implementation, the user may drag the inner ring 42, but a center position of the inner ring 42 cannot exceed a region in which the outer ring 44 is located. In another possible implementation, the center position of the inner ring 42 may exceed the region in which the outer ring 44 is located, but such an operation is considered as an invalid operation or a cancel operation.

Step 904: Receive a drag operation on the ability aiming control, the drag operation including a first operating point and a second operating point that are located on the ability aiming control, the first operating point being an initial operating point of the drag operation, and the second operating point being a current operating point of the drag operation.

For example, as shown in FIG. 10, the initial operating point of the drag operation is the first operating point 01, and the current operating point of the drag operation is the second operating point 02. The first operating point 01 is a center point of the outer ring 44. The second operating point 02 is a center point of the inner ring 42.

Step 906: Determine an aiming vector pointing from the first operating point to the second operating point in response to the drag operation.

The terminal determines the aiming vector pointing from the first operating point to the second operating point in response to the drag operation. For example, as shown in FIG. 10, a vector pointing from the first operating point 01 to the second operating point 02 is the aiming vector 03.

For example, the drag operation performed by the user on the ability aiming control may be an operation that presses and holds the inner ring 42 and drags the inner ring toward a certain direction, or may be another operation such as click, touch, slide that can cause the ability aiming control in the UI to generate a certain displacement. The first operating point 01 is a position in the UI that is first touched by the drag operation, the second operating point 02 is a position of the drag operation at a current time, and the terminal determines an aiming vector pointing from the first operating point 01 to the second operating point 02.

Step 908: Calculate, by using a center point on the UI as a first reference point, a pointed second reference point after the first reference point and the aiming vector are added.

Figure 11:
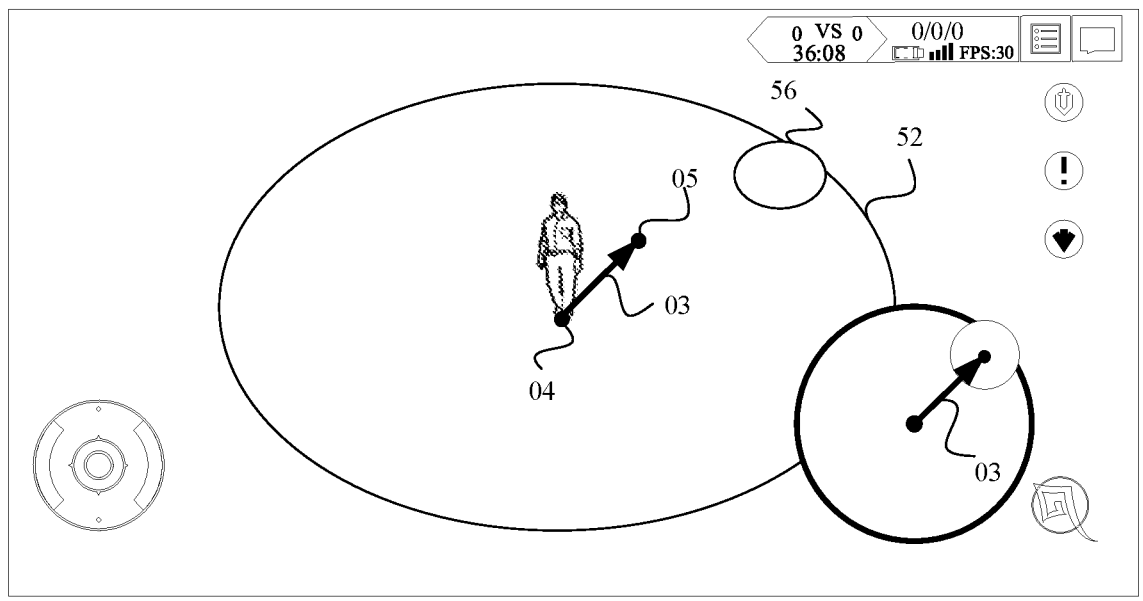
FIG. 11 is a schematic diagram of an interface of an ability aiming method in a three-dimensional virtual environment according to another exemplary embodiment of this application.

The terminal uses the center point of the UI as a first reference point, and calculates a pointed second reference point after the first reference point and the aiming vector are added. As shown in FIG. 11, the terminal uses the center point 04 of the UI as a first reference point, and calculates a pointed second reference point 05 after the first reference point 04 and the aiming vector 03 are added.

For example, the drag operation performed by the user on the ability aiming control may be an operation that long presses the inner ring and drags the inner ring toward a certain direction, or may be another operation such as click, touch, slide that can cause the ability aiming control in the UI to generate a certain displacement. The first operating point is a position in the UI that is first touched by the drag operation. The terminal calculates the pointed second reference point after the first reference point and the aiming vector are added.

Step 910: Convert the first reference point into a third reference point in the three-dimensional virtual environment by using an inverse transformation matrix, and convert the second reference point into a fourth reference point in the three-dimensional virtual environment by using the inverse transformation matrix.

The terminal converts the first reference point into a third reference point in the three-dimensional virtual environment by using an inverse transformation matrix, and converts the second reference point into a fourth reference point in the three-dimensional virtual environment by using the inverse transformation matrix.

The inverse transformation matrix is a transformation matrix used for implementing coordinate system transformation. In this embodiment, the inverse transformation matrix is used for converting a point on a two-dimensional coordinate system (for example, an imaging plane of the virtual camera) in which the virtual environment picture is located into a point on a casting platform (for example, the ground in the three-dimensional virtual environment) of a virtual character in a three-dimensional coordinate system in which the three-dimensional virtual environment is located. The formula is as follows:

$$Z_C \begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ X_w \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ X_w \\ 1 \end{bmatrix},$$

where $$\begin{bmatrix} f_x & 0 & u_0 & 0 \\ 0 & f_y & v_0 & 0 \\ 0 & 0 & 1 & 0 \end{bmatrix}$$

is a camera intrinsic matrix of the virtual camera, $$\begin{bmatrix} R & T \\ \vec{0} & 1 \end{bmatrix}$$

is a camera extrinsic matrix of the virtual camera, (u,v) is a point in a two-dimensional coordinate system, and ($X_w$, $Y_w$, $Z_w$) is a point in a three-dimensional coordinate system.

Figure 12:
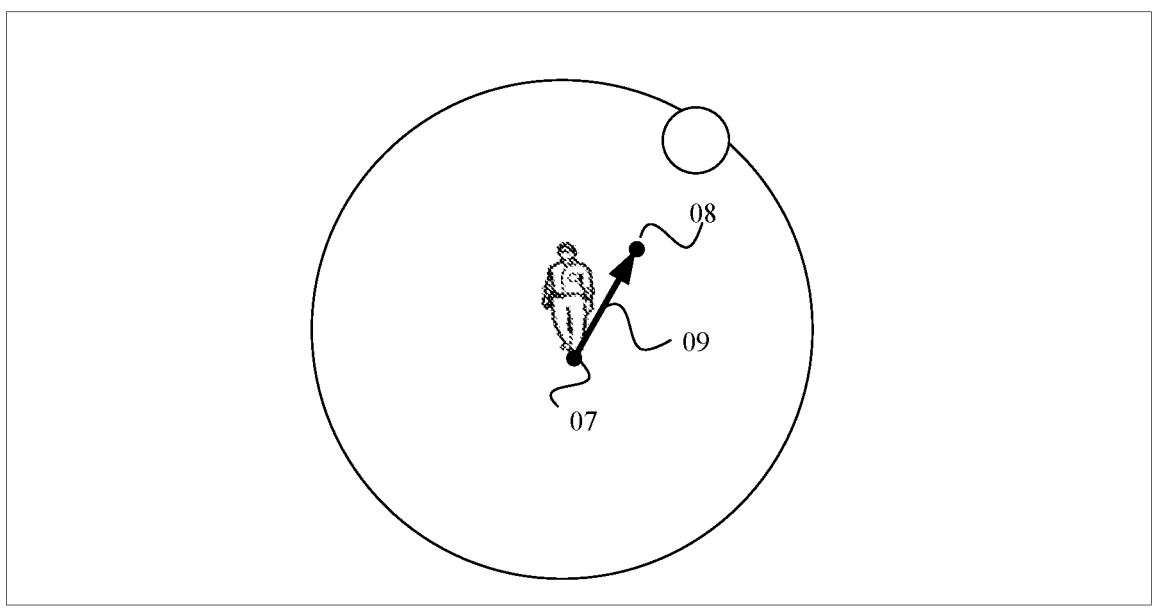
FIG. 12 is a schematic diagram of an interface of an ability aiming method in a three-dimensional virtual environment according to another exemplary embodiment of this application.

For example, as shown in FIG. 12, the terminal converts the first reference point 04 into the third reference point 07 in the three-dimensional virtual environment by using the inverse transformation matrix, and converts the second reference point 05 into the fourth reference point 08 in the three-dimensional virtual environment by using the inverse transformation matrix.

Optionally, the first reference point and the second reference point are points on the virtual environment picture, and the third reference point and the fourth reference point are points on a casting plane (for example, the ground) in the three-dimensional virtual environment.

Step 912: Determine a vector pointing from the third reference point to the fourth reference point as an ability aiming vector of a three-dimensional ability aiming indicator in the three-dimensional virtual environment.

The terminal determines the vector pointing from the third reference point to the fourth reference point as the ability aiming vector of the three-dimensional ability aiming indicator in the three-dimensional virtual environment. The ability aiming vector is used for indicating an aiming direction of an ability. Optionally, the ability aiming vector may be not used for indicating a cast distance of an ability and is only used for indicating an aiming direction.

For example, as shown in FIG. 12, the vector pointing from the third reference point 07 to the fourth reference point 08 is the ability aiming vector 09 of the three-dimensional ability aiming indicator in the three-dimensional virtual environment. The vector is only used for indicating an aiming direction.

Step 914: Display the three-dimensional ability aiming indicator according to the ability aiming vector, an ability aiming direction of the three-dimensional ability aiming indicator being parallel to a drag direction of the drag operation in the UI, and the drag direction corresponding to an aiming vector pointing from the first operating point to the second operating point.

The terminal displays the three-dimensional ability aiming indicator according to the ability aiming vector. The ability aiming indicator may be a wheel aiming indicator, a unidirectional single-arrow aiming indicator, a fan-shaped aiming indicator, or a unidirectional multi-arrow aiming indicator.

Figure 13:
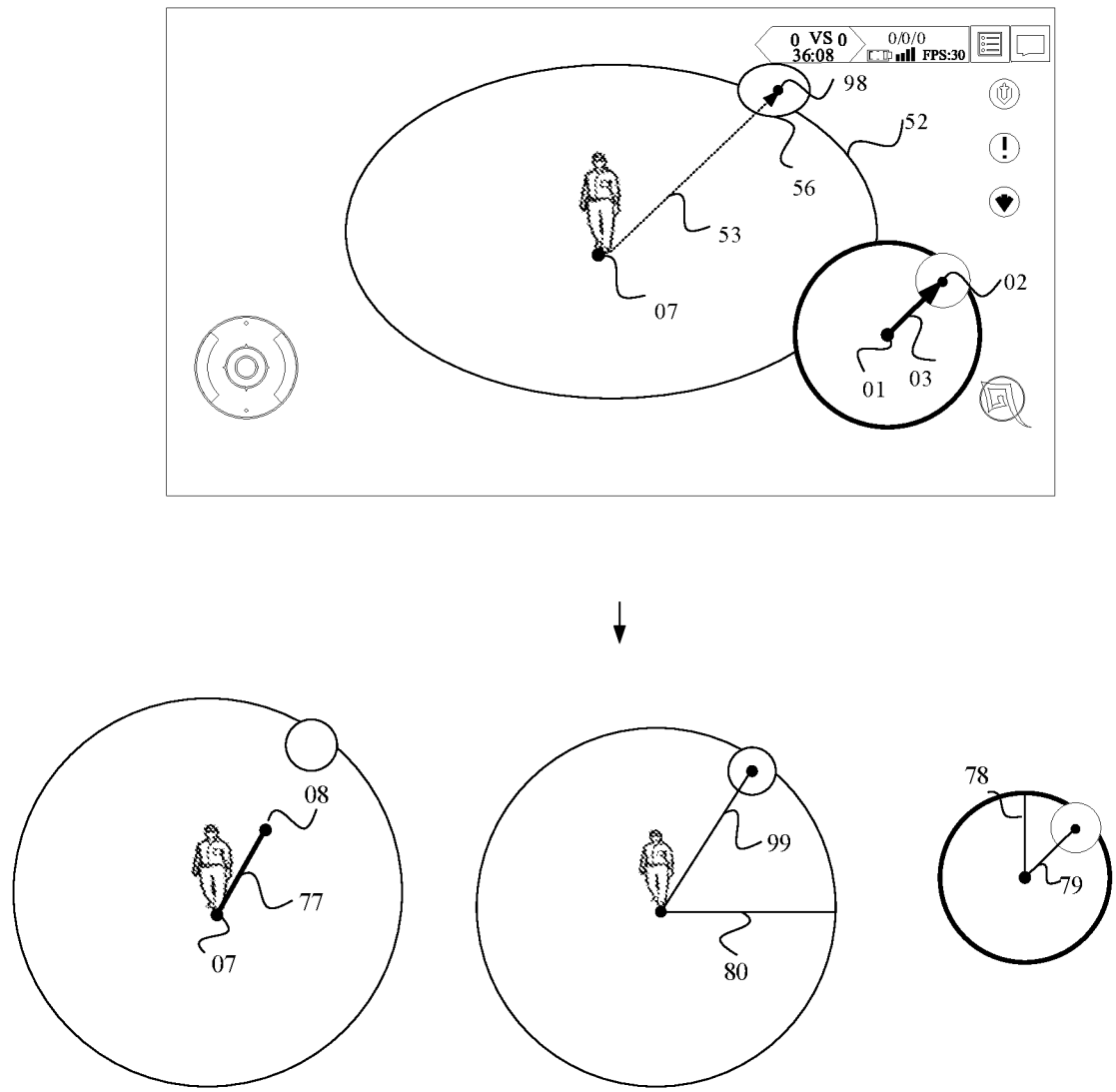
FIG. 13 is a schematic diagram of an interface of an ability aiming method in a three-dimensional virtual environment according to another exemplary embodiment of this application.

As shown in FIG. 13, the three-dimensional ability aiming indicator 56 is displayed according to the aiming vector 03, and a direction 53 of the three-dimensional ability aiming indicator is not explicitly displayed. The direction 53 of the ability aiming indicator is parallel to the drag direction 03 of the drag operation in the UI 40.

Step 916: Cast an ability to a target position in response to a received cast operation.

For example, the cast operation is an operation that the finger of the user releases the inner ring 42. In response to the received cast operation, the terminal casts an ability to a target position pointed by the aiming vector.

For example, the virtual character is an attack wizard, and the three-dimensional ability aiming indicator is a wheel aiming indicator. The terminal throws out a fire boom to the target position in response to the wheel aiming indicator. For example, the virtual character is an attack wizard, and the three-dimensional ability aiming indicator is a unidirectional single-arrow aiming indicator. The terminal throws out a folding fan to the target position in response to the unidirectional single-arrow aiming indicator, and when the folding fan encounters a virtual character of another camp, the folding fan may cause certain damage to the virtual character of another camp. The damage may be a decrease in a magic point, a decrease in a health point, a decrease in an attack power, or a decrease in a defensive power.

For example, the virtual character is a defensive support, and the three-dimensional ability aiming indicator is a wheel aiming indicator. The terminal throws out a circle to the target position in response to the wheel aiming indicator. The circle may transport virtual characters of the same camp back to a spring, or may summon virtual characters of the same camp to a position of the circle. For example, the virtual character is a defensive support, and the three-dimensional ability aiming indicator is a unidirectional single-arrow aiming indicator. The terminal throws out a ball to the target position in response to the unidirectional single-arrow aiming indicator, and the ball may bounce off a virtual character of another camp.

For example, the virtual character is an agile assassin, and the three-dimensional ability aiming indicator may be a unidirectional single-arrow aiming indicator. The terminal controls the virtual character to move toward the target position in response to the unidirectional single-arrow aiming indicator. For example, in a movement process, the virtual character may increase a health point as long as another virtual character is encountered. For example, in a movement process, the virtual character may generate a slowdown effect to another virtual character as long as the another virtual character is encountered.

In a possible implementation, when the second operating point that the user ends the drag operation is within a fixed region in the UI, the terminal cancels ability casting, and fixed region may be referred to as an ability canceling region. Similarly, when the second operating point of the drag operation of the user is not within the ability canceling region, the terminal may cast the ability.

Based on the above, according to the method provided in this embodiment, by determining the first reference point, the second reference point, and the third reference point and the fourth reference point that are in the virtual environment and obtained through the inverse transformation matrix, the vector pointing from the third reference point to the fourth reference point is determined as the ability direction of the three-dimensional ability aiming indicator in the virtual environment. Finally, the ability aiming direction of the three-dimensional ability aiming indicator displayed in the virtual environment picture is caused to be parallel to the drag direction of the drag operation through mapping. Therefore, in this application, the accuracy of ability aiming is improved, and the human-computer interaction efficiency is also improved to some extent.

The foregoing embodiment describes a case that the aiming direction of the three-dimensional ability aiming indicator in the virtual environment picture is parallel to the drag direction of the drag operation. However, the three-dimensional ability aiming indicator not only indicates a direction in which the virtual character casts an ability, but also indicates a cast distance of the virtual character. The cast distance may be fixed and is a fixed cast distance determined by the application program according to different virtual characters or different abilities. The cast distance may be alternatively random and is determined according to a distance between the first operating point and the second operating point of the drag operation of the user.

That is, the ability aiming control includes a maximum aiming distance, and there is a first ratio of a first distance between the first operating point and the second operating point to the maximum aiming distance. The ability includes a maximum ability distance in the three-dimensional virtual environment, the three-dimensional ability aiming indicator includes a first aiming point and a second aiming point in the three-dimensional virtual environment, the first aiming point is an initial point during ability aiming, the second aiming point is a target point during ability aiming, and there is a second ratio of a second distance between the first aiming point and the second aiming point to the maximum ability distance. The first ratio and the second ratio are the same.

Figure 14:
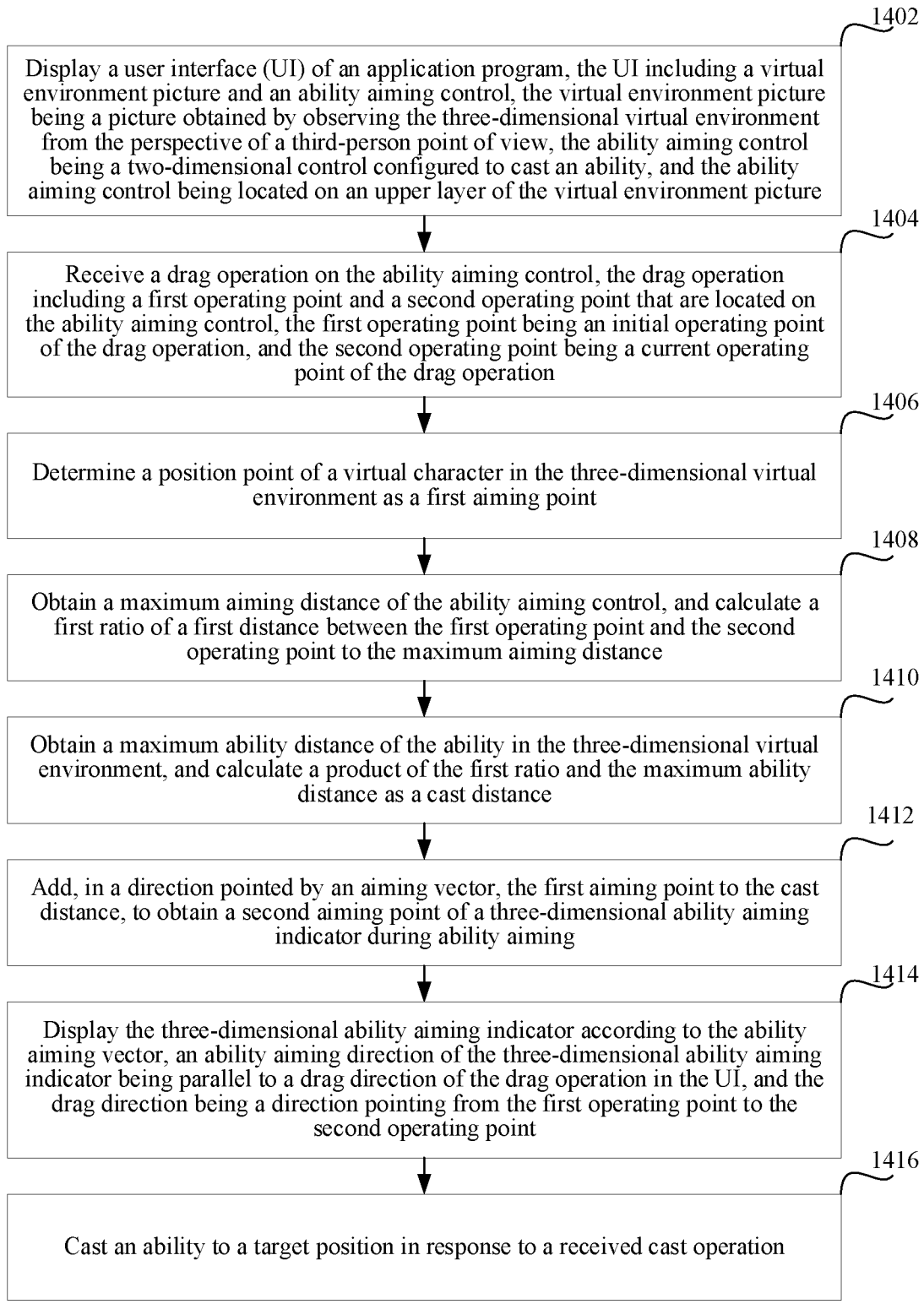
FIG. 14 is a flowchart of an ability aiming method in a three-dimensional virtual environment according to another exemplary embodiment of this application.

FIG. 14 is a flowchart of an ability aiming method in a three-dimensional virtual environment according to another exemplary embodiment of this application. The method may be performed by a computer device, and the computer device may be a terminal, a server, or a terminal and a server, where the terminal may be the terminal 220 in FIG. 2 and the server may be the server 240 in FIG. 2. In this method, the cast distance of the virtual character is determined according to a distance between the first operating point and the second operating point of the drag operation of the user. An example in which the method is performed by a terminal is used, and the method includes:

Step 1402: Display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture.

Step 1404: Receive a drag operation on the ability aiming control, the drag operation including a first operating point and a second operating point that are located on the ability aiming control, the first operating point being an initial operating point of the drag operation, and the second operating point being a current operating point of the drag operation.

Step 1406: Determine a position point of a virtual character in the three-dimensional virtual environment as a first aiming point.

The terminal determines the position point of the virtual character in the three-dimensional virtual environment as the first aiming point.

For example, when the virtual character is an attack wizard, the first aiming point is a position of the attack wizard. For example, when the virtual character is a defensive support, the first aiming point is a position of the defensive support.

Step 1408: Obtain a maximum aiming distance of the ability aiming control, and calculate a first ratio of a first distance between the first operating point and the second operating point to the maximum aiming distance.

The terminal obtains the maximum aiming distance of the ability aiming control, and calculates the first ratio of the first distance between the first operating point and the second operating point to the maximum aiming distance.

For example, as shown in FIG. 13, a formula is as follows:

$$|B-A|/\text{AimRadius} = |F-H|/\text{SillRange},$$

where $$|B-A|/\text{AimRadius}$$

is the first ratio of the first distance 79 between the first operating point and the second operating point to the maximum aiming distance 78. A second ratio of a second distance 77 between the third reference point 07 and the fourth reference point 08 to the maximum ability distance 80 is the same as the foregoing first ratio. $^{SillRange}$ is the maximum ability distance 80. A point H is the position of the virtual character. An ability impact point may be calculated according to the formula as follows:

$$\text{AimPoint} = H + \text{Normalize}(D_b - D_a) * (|B-A|/\text{AimRadius}) * \text{SillRange}$$

where

Aimpoint is a position 98 of a point F, $D_a$ is the position 07 of the third reference point in the three-dimensional virtual environment of the first reference point through inverse transformation matrix, $D_b$ is the position 08 of the fourth reference point in the three-dimensional virtual environment of the second reference point through inverse transformation matrix, and Normalize($D_b - D_a$) is a unit vector pointing from the third reference point 07 to the fourth reference point 08. The maximum aiming distance is a radius of the outer ring of the ability aiming control.

Step 1410: Obtain a maximum ability distance of the ability in the three-dimensional virtual environment, and calculate a product of the first ratio and the maximum ability distance as a cast distance.

The terminal obtains the maximum ability distance of the ability in the three-dimensional virtual environment, and calculates the product of the first ratio and the maximum ability distance as the cast distance.

The maximum ability distance is a maximum radius of an ability that the virtual character can cast in the three-dimensional virtual environment. The cast distance is a distance between the position of the virtual character and the position to which the virtual character casts an ability.

For example, as shown in FIG. 13, a distance between the position 07 of the virtual character and the position 98 to which the virtual character casts an ability is a cast distance 99. The cast distance 99 is a product of the first ratio and the maximum ability distance 80.

For example, the cast distance may be fixed. For example, one summoner ability of an attack wizard is to emit a flame with a fixed length. In this case, the user may control a direction of the flame, but cannot control a range, namely, the cast distance of the flame. In another example, one summoner ability of a defensive support is to place a shield at a position with a fixed distance, and the shield may be used for defending against attacks of virtual characters of another camp. In this case, the user may control a direction of the shield, but cannot control a distance between a position of the shield and a position of the virtual character.

For example, the cast distance is a product of the first ratio and the maximum ability distance. For example, one summoner ability of an attack wizard is to freeze one position. The user may drag the ability aiming control through a drag operation to cause the attack wizard to determine a position to be frozen in the ability aiming direction of the three-dimensional ability aiming indicator and using the product of the first ratio and the maximum ability distance as the cast distance.

Step 1412: Add, in a direction pointed by an aiming vector, the first aiming point to the cast distance, to obtain a second aiming point of a three-dimensional ability aiming indicator during ability aiming.

The terminal adds, in the direction pointed by the aiming vector, the first aiming point to the cast distance, to obtain the second aiming point of the three-dimensional ability aiming indicator during ability aiming.

For example, when the cast distance is a fixed value, the virtual character casts toward a position with a fixed distance in the direction of the aiming vector.

For example, when the cast distance is the product of the first ratio and the maximum ability distance, the virtual character casts toward a position with a certain cast distance in the direction of the aiming vector.

Step 1414: Display the three-dimensional ability aiming indicator according to the ability aiming vector, an ability aiming direction of the three-dimensional ability aiming indicator being parallel to a drag direction of the drag operation in the UI, and the drag direction corresponding to an aiming vector pointing from the first operating point to the second operating point.

Step 1416: Cast an ability to a target position in response to a received cast operation.

Based on the above, according to the method provided in this embodiment, by causing an ability aiming direction of a three-dimensional ability aiming indicator in a UI to be parallel to a drag direction of a drag operation, the ability aiming direction observed by a user matches a hand action of the user, thereby improving the accuracy of ability aiming. Unnecessary correction operations are reduced, so that the human-computer interaction efficiency is also improved to some extent.

According to the method provided in this embodiment, the first ratio of the first distance between the first operating point and the second operating point to the maximum aiming distance, and the product of the first ratio and the maximum ability distance is calculated as the cast distance. In this way, the cast distance of the virtual character is determined according to the distance between the first operating point and the second operating point of the drag operation of the user, thereby improving the human-computer interaction efficiency.

Figure 15:
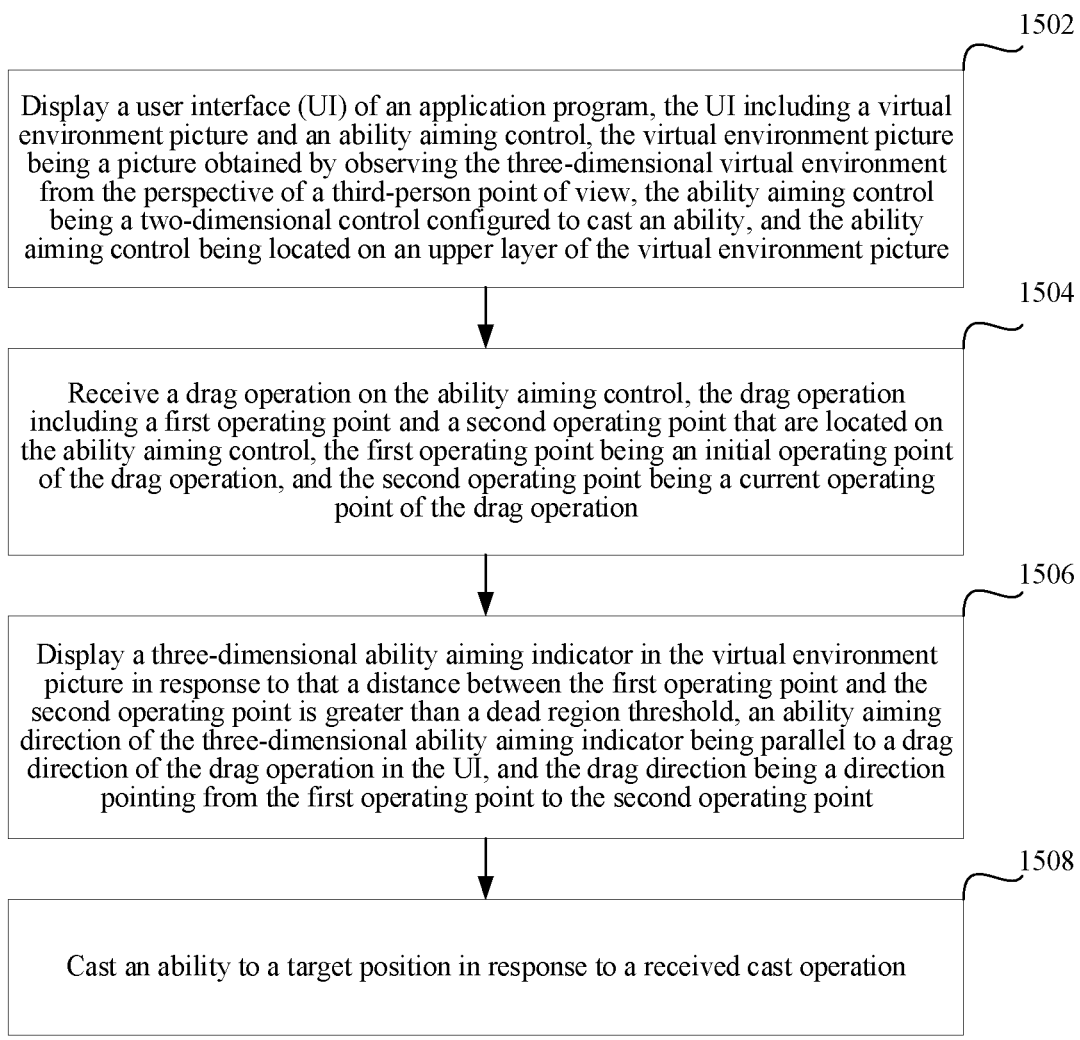
FIG. 15 is a flowchart of an ability aiming method in a three-dimensional virtual environment according to another exemplary embodiment of this application.

FIG. 15 is a flowchart of an ability aiming method in a three-dimensional virtual environment according to another exemplary embodiment of this application. The method may be performed by a computer device, and the computer device may be a terminal, a server, or a terminal and a server, where the terminal may be the terminal 220 in FIG. 2 and the server may be the server 240 in FIG. 2. An example in which the method is performed by a terminal is used, and the method includes:

Step 1502: Display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture.

The terminal displays the UI of the application program.

Step 1504: Receive a drag operation on the ability aiming control, the drag operation including a first operating point and a second operating point that are located on the ability aiming control, the first operating point being an initial operating point of the drag operation, and the second operating point being a current operating point of the drag operation.

The terminal receives a drag operation on the ability aiming control.

Step 1506: Display a three-dimensional ability aiming indicator in the virtual environment picture in response to that a distance between the first operating point and the second operating point is greater than a dead region threshold, an ability aiming direction of the three-dimensional ability aiming indicator being parallel to a drag direction of the drag operation in the UI, and the drag direction corresponding to an aiming vector pointing from the first operating point to the second operating point.

The terminal displays the three-dimensional ability aiming indicator in the virtual environment picture in response to that the distance between the first operating point and the second operating point is greater than the dead region threshold.

For example, as shown in FIG. 10, when the user performs a drag operation, the three-dimensional ability aiming indicator is only displayed in the virtual environment picture when the distance between the first operating point 01 and the second operating point 02 that are generated based on the drag operation is greater than the dead region threshold 00.

For example, the dead region threshold may be a fixed value set by the application program or may be different values generated according to different abilities of different virtual characters.

For example, when the user performs a drag operation, the three-dimensional ability aiming indicator is not displayed in the three-dimensional virtual environment when the distance between the first operating point and the second operating point is less than the dead region threshold.

Step 1508: Cast an ability to a target position in response to a received cast operation.

Based on the above, according to the method provided in this embodiment, by causing an ability aiming direction of a three-dimensional ability aiming indicator in a UI to be parallel to a drag direction of a drag operation, the ability aiming direction observed by a user matches a hand action of the user, thereby improving the accuracy of ability aiming. Unnecessary correction operations are reduced, so that the human-computer interaction efficiency is also improved to some extent.

According to the method provided in this embodiment, a dead region is set, so that the three-dimensional ability aiming indicator is only triggered when the distance between the first operating point and the second operating point of the drag operation of the user is greater than the dead region threshold. In this way, in cases that the user accidently touches the ability aiming control or temporarily does not intend to cast the ability, appearance of the three-dimensional ability aiming indicator may be avoided by adjusting the position of the second operating point, to achieve the objective of preventing the virtual character from casting an ability. Unnecessary ability casting is reduced, so that the human-computer interaction efficiency is improved to some extent.

Figure 16:
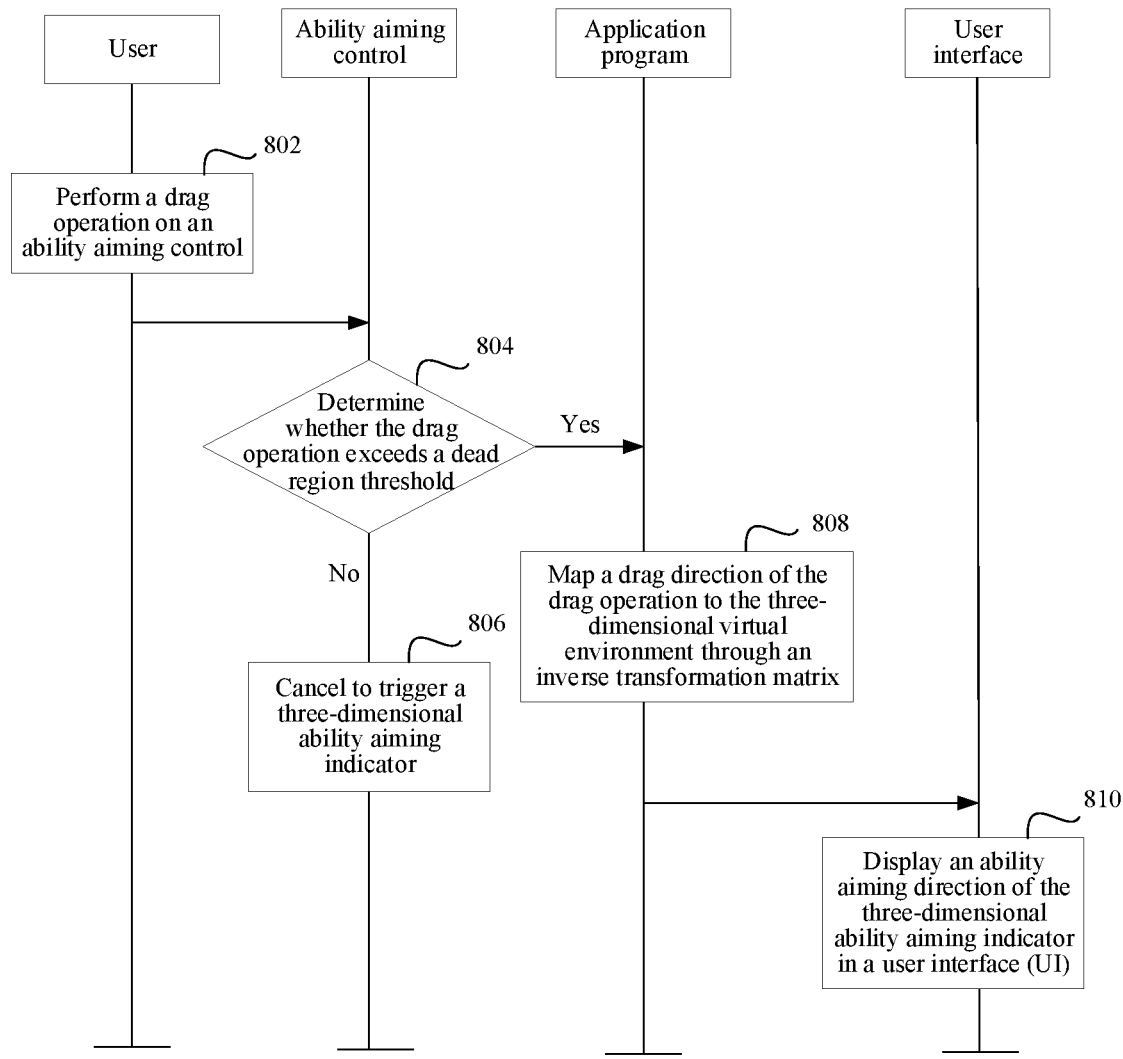
FIG. 16 is a block diagram of an ability aiming method in a three-dimensional virtual environment according to another exemplary embodiment of this application.

FIG. 16 is a block diagram of an ability aiming method in a three-dimensional virtual environment according to another exemplary embodiment of this application. The method further includes the following steps:

Step 802: A user performs a drag operation on an ability aiming control.

Step 804: Determine whether the drag operation exceeds a dead region threshold.

If the drag operation does not exceed the dead region threshold, step 806 is performed.

If the drag operation exceeds the dead region threshold, step 808 is performed.

Step 806: Cancel to trigger a three-dimensional ability aiming indicator.

Step 808: Map a drag direction of the drag operation to the three-dimensional virtual environment through an inverse transformation matrix.

Step 810: Display an ability aiming direction of the three-dimensional ability aiming indicator in a user interface (UI).

In the foregoing embodiment, description is made by using an example in which the terminal is a device with a touch screen. In the following embodiments, this specification is to describes an ability aiming method of a terminal connected to a physical aiming component. For example, the physical aiming component includes a physical button or joystick. For example, the physical aiming component is motion sensing, and specifically, may be a joystick with an acceleration sensor. The joystick may capture a movement trajectory of the user after holding the joystick. The physical aiming component may alternatively be one or more depth cameras. The depth camera includes a space perception capability and can recognize an aiming operation brought by limb swinging of the user.

Figure 17:
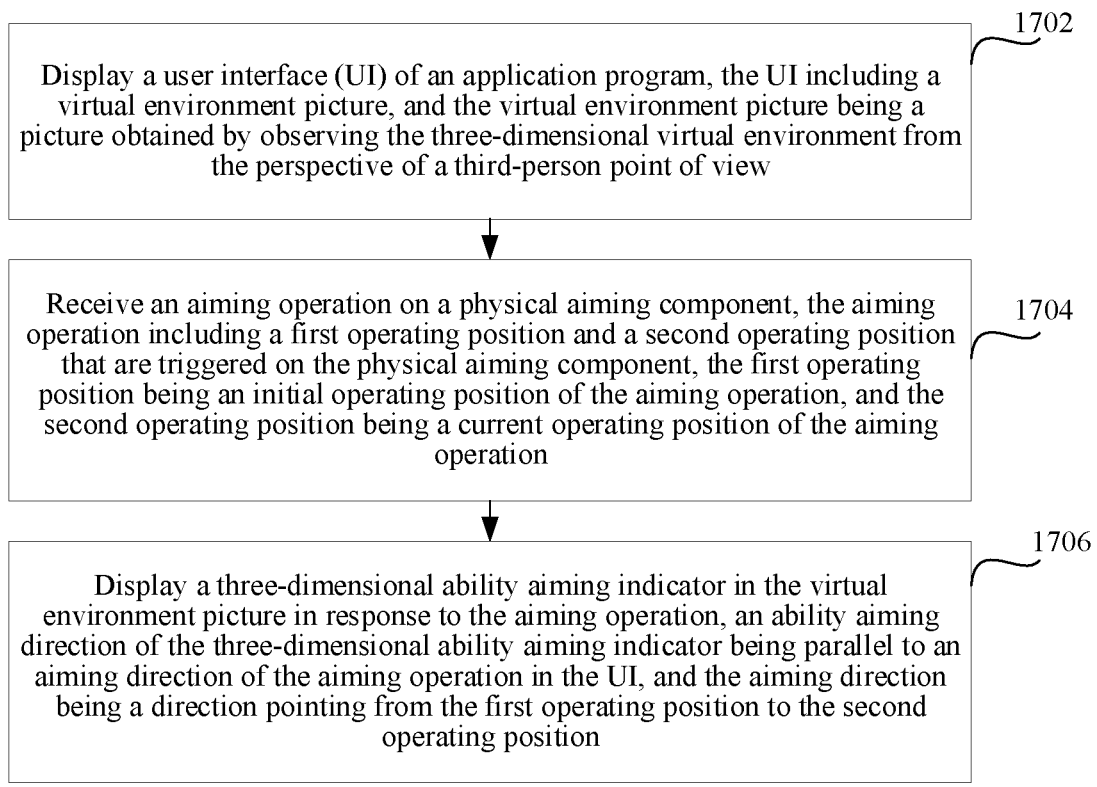
FIG. 17 is a flowchart of an ability aiming method in a three-dimensional virtual environment according to another exemplary embodiment of this application.

FIG. 17 is a flowchart of an ability aiming method in a three-dimensional virtual environment according to another exemplary embodiment of this application.

Step 1702: Display a user interface (UI) of an application program, the UI including a virtual environment picture, and the virtual environment picture being a picture obtained by observing the three-dimensional virtual environment from the perspective of a third-person point of view.

Step 1704: Receive an aiming operation on a physical aiming component, the aiming operation including a first operating position and a second operating position that are triggered on the physical aiming component, the first operating position being an initial operating position of the aiming operation, and the second operating position being a current operating position of the aiming operation.

For example, the terminal is connected to a physical aiming component, and the physical aiming component includes a physical button or joystick. The first operating position is an initial operating position when the user presses the button or operates the joystick. The second operating position is a position at which the button stays after the user presses the button or a joystick stay position after the joystick is operated.

For example, the terminal is connected to a physical aiming component, the physical aiming component is a joystick in which an acceleration sensor is installed, and the acceleration sensor may capture a trajectory of a hand after the user holds the joystick. The first operating position is a position when the user holds the joystick in an initial static state, and the second operating position is a position at which the joystick stays at a current time after the user moves the joystick.

For example, the terminal is connected to a physical aiming component, and the physical aiming component includes one or more cameras with a space perception capability. The first operating position is an operating position of the hand of the user in an initial static state that is captured by the camera, and the second operating position is a position at which the hand of the user stays at a current time that is captured by the camera after the hand of the user moves.

For example, the physical aiming component is connected to the terminal through a universal serial bus (USB) interface, or may be connected to the terminal through Bluetooth, and the terminal may be a desktop computer.

Step 1706: Display a three-dimensional ability aiming indicator in the virtual environment picture in response to the aiming operation, an ability aiming direction of the three-dimensional ability aiming indicator being parallel to an aiming direction of the aiming operation in the UI, and the aiming direction being a direction pointing from the first operating position to the second operating position.

For example, the terminal is connected to a physical aiming component, and the physical aiming component includes a physical button or joystick. The first operating position is an initial operating position when the user presses the button or operates the joystick. The second operating position is a position at which the button stays after the user presses the button or a joystick stay position after the joystick is operated. For example, the aiming direction points from an initial operating position when the user presses the button to a position at which the button stays after the user presses the button, and the ability aiming direction of the three-dimensional ability aiming indicator is parallel to the aiming direction of the aiming operation in the UI. For example, the aiming direction points from an initial operating position when the user operates the joystick to a stay position of the joystick after the joystick is operated, and the ability aiming direction of the three-dimensional ability aiming indicator is parallel to the aiming direction of the aiming operation in the UI.

For example, the terminal is connected to a physical aiming component, the physical aiming component is a joystick in which an acceleration sensor is installed, and the acceleration sensor may capture a trajectory of a hand after the user holds the joystick. The first operating position is a position when the user holds the joystick in an initial static state, and the second operating position is a position at which the joystick stays at a current time after the user moves the joystick. The aiming direction points from a position when the user holds the joystick in an initial static state to a position at which the joystick stays at a current time after the user moves the joystick, and the ability aiming direction of the three-dimensional ability aiming indicator is parallel to the aiming direction of the aiming operation in the UI.

For example, the terminal is connected to a physical aiming component, and the physical aiming component includes one or more cameras with a space perception capability. The first operating position is an operating position of the hand of the user in an initial static state that is captured by the camera, and the second operating position is a position at which the hand of the user stays at a current time that is captured by the camera after the hand of the user moves. The aiming direction points from an operating position of the hand of the user in an initial static state that is captured by the camera to a position at which the hand of the user stays at a current time that is captured by the camera after the hand of the user moves, and the ability aiming direction of the three-dimensional ability aiming indicator is parallel to the aiming direction of the aiming operation in the UI.

In this embodiment, by causing the ability aiming direction of the three-dimensional ability aiming indicator in the UI to be parallel to the aiming direction of the aiming operation, the ability aiming direction observed by a user matches a hand action or a limb action of the user, thereby improving the accuracy of ability aiming. Unnecessary correction operations are reduced, so that the human-computer interaction efficiency is also improved to some extent.

The first operating position described in this embodiment is equivalent to the first operating point described in the foregoing embodiment, the second operating position is equivalent to the second operating point described in the foregoing embodiment, and the aiming operation is equivalent to the drag operation described in the foregoing embodiment. In this embodiment, a related ability aiming principle is similar to that of the foregoing embodiment, a person of ordinary skill in the art may understand this embodiment with reference to the foregoing embodiment, and details are not described herein again.

Figure 18:
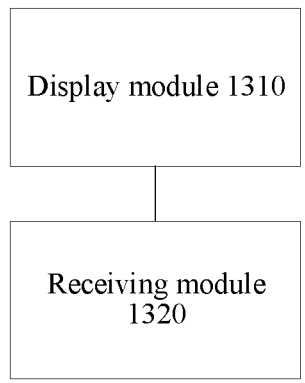
FIG. 18 is a schematic diagram of an ability aiming apparatus in a three-dimensional virtual environment according to an exemplary embodiment of this application.

FIG. 18 is a schematic diagram of an ability aiming apparatus in a three-dimensional virtual environment according to an exemplary embodiment of this application, and the apparatus may be applicable to a computer device. The apparatus includes:

a display module 1310, configured to display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture;

a receiving module 1320, configured to receive a drag operation on the ability aiming control, the drag operation including a first operating point and a second operating point that are located on the ability aiming control, the first operating point being an initial operating point of the drag operation, and the second operating point being a current operating point of the drag operation; and the display module 1310 being further configured to display a three-dimensional ability aiming indicator in the virtual environment picture in response to the drag operation, an ability aiming direction of the three-dimensional ability aiming indicator being parallel to a drag direction of the drag operation in the UI, and the drag direction corresponding to an aiming vector pointing from the first operating point to the second operating point.

Based on the above, according to the apparatus provided in this embodiment, by causing an ability aiming direction of a three-dimensional ability aiming indicator in a UI to be parallel to a drag direction of a drag operation, the ability aiming direction observed by a user matches a hand action of the user, thereby improving the accuracy of ability aiming. Unnecessary correction operations are reduced, so that the human-computer interaction efficiency is also improved to some extent.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 19:
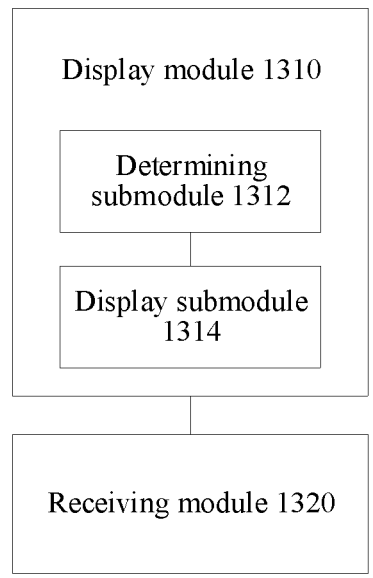
FIG. 19 is a schematic diagram of an ability aiming apparatus in a three-dimensional virtual environment according to another exemplary embodiment of this application.

FIG. 19 is a schematic diagram of an ability aiming apparatus in a three-dimensional virtual environment according to another exemplary embodiment of this application, and the apparatus may be applicable to a computer device. The apparatus includes:

a display module 1310, configured to display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture;

a receiving module 1320, configured to receive a drag operation on the ability aiming control, the drag operation including a first operating point and a second operating point that are located on the ability aiming control, the first operating point being an initial operating point of the drag operation, and the second operating point being a current operating point of the drag operation; and the display module 1310 being further configured to display a three-dimensional ability aiming indicator in the virtual environment picture in response to the drag operation, an ability aiming direction of the three-dimensional ability aiming indicator being parallel to a drag direction of the drag operation in the UI, and the drag direction corresponding to an aiming vector pointing from the first operating point to the second operating point.

In an embodiment, the display module includes a determining submodule 1312 and a display submodule 1314.

The determining submodule 1312 is configured to determine, in response to the drag operation and according to an aiming vector pointing from the first operating point to the second operating point, an ability aiming vector of the three-dimensional ability aiming indicator in the three-dimensional virtual environment; and the display submodule 1314 is further configured to display the three-dimensional ability aiming indicator according to the ability aiming vector.

Based on the above, according to the apparatus provided in this embodiment, by causing an ability aiming direction of a three-dimensional ability aiming indicator in a UI to be parallel to a drag direction of a drag operation, the drag direction of the drag operation being a direction pointing from the first operating point to the second operating point, the ability aiming direction observed by a user matches a hand action of the user, thereby improving the accuracy of ability aiming. Unnecessary correction operations are reduced, so that the human-computer interaction efficiency is also improved to some extent.

Figure 20:
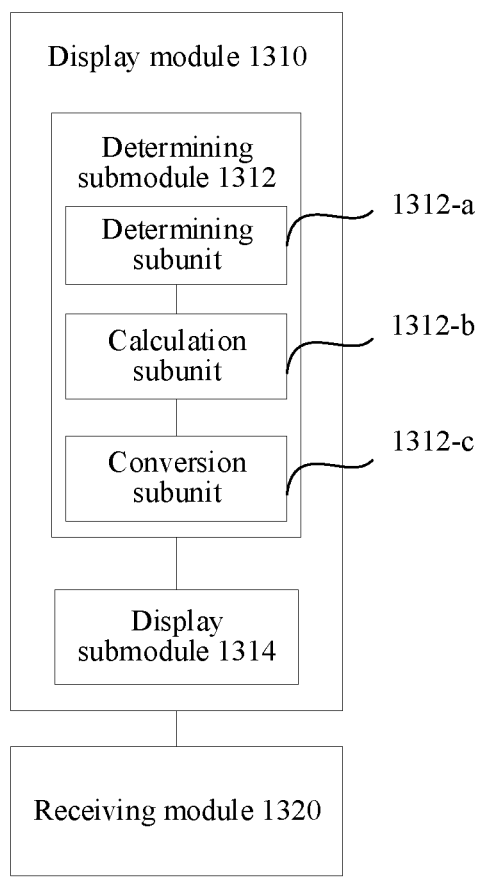
FIG. 20 is a schematic diagram of an ability aiming apparatus in a three-dimensional virtual environment according to another exemplary embodiment of this application.

FIG. 20 is a schematic diagram of an ability aiming apparatus in a three-dimensional virtual environment according to another exemplary embodiment of this application, and the apparatus may be applicable to a computer device. The apparatus includes:

a display module 1310, configured to display a user interface (UI) of an application program, the UI including a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture;

a receiving module 1320, configured to receive a drag operation on the ability aiming control, the drag operation including a first operating point and a second operating point that are located on the ability aiming control, the first operating point being an initial operating point of the drag operation, and the second operating point being a current operating point of the drag operation; and the display module 1310 being further configured to display a three-dimensional ability aiming indicator in the virtual environment picture in response to the drag operation, an ability aiming direction of the three-dimensional ability aiming indicator being parallel to a drag direction of the drag operation in the UI, and the drag direction corresponding to an aiming vector pointing from the first operating point to the second operating point.

In an embodiment, the display module 1310 includes a determining submodule 1312 and a display submodule 1314.

The determining submodule 1312 is configured to determine, in response to the drag operation and according to an aiming vector pointing from the first operating point to the second operating point, an ability aiming vector of the three-dimensional ability aiming indicator in the three-dimensional virtual environment; and the display submodule 1314 is further configured to display the three-dimensional ability aiming indicator according to the ability aiming vector.

In an embodiment, the determining submodule 1312 includes:

a determining subunit 1312-*a*, configured to determine the aiming vector pointing from the first operating point to the second operating point;

a calculation subunit 1312-*b*, configured to calculate, by using a center point on the UI as a first reference point, a pointed second reference point after the first reference point and the aiming vector are added;

a conversion subunit 1312-*c*, configured to convert the first reference point into a third reference point in the three-dimensional virtual environment by using an inverse transformation matrix, and convert the second reference point into a fourth reference point in the three-dimensional virtual environment by using the inverse transformation matrix; and the determining subunit 1312-*a* being further configured to determine a vector pointing from the third reference point to the fourth reference point as the ability aiming vector of the three-dimensional ability aiming indicator in the three-dimensional virtual environment.

In an embodiment, the ability aiming control includes a maximum aiming distance, and there is a first ratio of a first distance between the first operating point and the second operating point to the maximum aiming distance; and the ability includes a maximum ability distance in the three-dimensional virtual environment, the three-dimensional ability aiming indicator includes a first aiming point and a second aiming point that are in the three-dimensional virtual environment, the first aiming point is an initial point during ability aiming, the second aiming point is a target point during ability aiming, and there is a second ratio of a second distance between the first aiming point and the second aiming point to the maximum ability distance, the first ratio and the second ratio being the same.

In an embodiment, the display submodule 1314 is further configured to determine a position point of the virtual character in the three-dimensional virtual environment as the first aiming point; determine the second aiming point of the three-dimensional ability aiming indicator during ability aiming according to the first aiming point and the ability aiming vector; and display the three-dimensional ability aiming indicator according to the first aiming point and the second aiming point.

In an embodiment, the display submodule 1314 is further configured to obtain the maximum aiming distance of the ability aiming control, and calculate the first ratio of the first distance between the first operating point and the second operating point to the maximum aiming distance;

the display submodule 1314 is further configured to obtain the maximum ability distance of the ability in the three-dimensional virtual environment, and calculate a product of the first ratio and the maximum ability distance as a cast distance; and the display submodule 1314 is further configured to add, in a direction pointed by the aiming vector, the first aiming point to the cast distance, to obtain the second aiming point of the three-dimensional ability aiming indicator during ability aiming.

In an embodiment, the display module 1310 is further configured to display the three-dimensional ability aiming indicator in the virtual environment picture in response to that a distance between the first operating point and the second operating point is greater than a dead region threshold.

Based on the above, according to the apparatus provided in this embodiment, by determining the first reference point, the second reference point, and the third reference point and the fourth reference point that are in the virtual environment and obtained through the inverse transformation matrix, the vector pointing from the third reference point to the fourth reference point is determined as the ability direction of the three-dimensional ability aiming indicator in the virtual environment. Finally, the ability aiming direction of the three-dimensional ability aiming indicator displayed in the virtual environment picture is caused to be parallel to the drag direction of the drag operation through mapping. The first ratio of the first distance between the first operating point and the second operating point to the maximum aiming distance, and the product of the first ratio and the maximum ability distance is calculated as the cast distance. In this way, the cast distance of the virtual character is determined according to the distance between the first operating point and the second operating point of the drag operation of the user, thereby improving the human-computer interaction efficiency.

FIG. 18 is a schematic diagram of an ability aiming apparatus in a three-dimensional virtual environment according to another exemplary embodiment of this application, the apparatus is connected to a physical aiming component, and the apparatus may be applicable to a computer device. The apparatus includes:

a display module 1310, configured to display a user interface (UI) of an application program, the UI including a virtual environment picture, and the virtual environment picture being a picture obtained by observing the three-dimensional virtual environment from the perspective of a third-person point of view;

a receiving module 1320, configured to receive an aiming operation on the physical aiming component, the aiming operation including a first operating position and a second operating position that are on the physical aiming component, the first operating position being an initial operating position of the aiming operation, and the second operating position being a current operating position of the aiming operation; and the display module 1310 being further configured to display a three-dimensional ability aiming indicator in the virtual environment picture in response to the aiming operation, an ability aiming direction of the three-dimensional ability aiming indicator being parallel to an aiming direction of the aiming operation in the UI, and the aiming direction being a direction pointing from the first operating position to the second operating position.

Based on the above, according to the apparatus provided in this embodiment, by causing the ability aiming direction of the three-dimensional ability aiming indicator in the UI to be parallel to the aiming direction of the aiming operation, the ability aiming direction observed by a user matches a hand action or a limb action of the user, thereby improving the accuracy of ability aiming. Unnecessary correction operations are reduced, so that the human-computer interaction efficiency is also improved to some extent.

FIG. 19 is a schematic diagram of an ability aiming apparatus in a three-dimensional virtual environment according to another exemplary embodiment of this application, the apparatus is connected to a physical aiming component, and the apparatus may be applicable to a computer device. The apparatus includes:

a display module 1310, configured to display a user interface (UI) of an application program, the UI including a virtual environment picture, and the virtual environment picture being a picture obtained by observing the three-dimensional virtual environment from the perspective of a third-person point of view;

a receiving module 1320, configured to receive an aiming operation on the physical aiming component, the aiming operation including a first operating position and a second operating position that are on the physical aiming component, the first operating position being an initial operating position of the aiming operation, and the second operating position being a current operating position of the aiming operation; and the display module 1310 being further configured to display a three-dimensional ability aiming indicator in the virtual environment picture in response to the aiming operation, an ability aiming direction of the three-dimensional ability aiming indicator being parallel to an aiming direction of the aiming operation in the UI, and the aiming direction being a direction pointing from the first operating position to the second operating position.

In an embodiment, the display module includes a determining submodule 1312 and a display submodule 1314.

The determining submodule 1312 is configured to determine, in response to the aiming operation and according to an aiming vector pointing from the first operating position to the second operating position, an ability aiming vector of the three-dimensional ability aiming indicator in the three-dimensional virtual environment; and the display submodule 1314 is further configured to display the three-dimensional ability aiming indicator according to the ability aiming vector.

Based on the above, according to the apparatus provided in this embodiment, by causing an ability aiming direction of a three-dimensional ability aiming indicator in a UI to be parallel to an aiming direction of an aiming operation, the aiming direction of the aiming operation being a direction pointing from the first operating position to the second operating position, the ability aiming direction observed by a user matches a hand action or a limb action of the user, thereby improving the accuracy of ability aiming. Unnecessary correction operations are reduced, so that the human-computer interaction efficiency is also improved to some extent.

FIG. 20 is a schematic diagram of an ability aiming apparatus in a three-dimensional virtual environment according to another exemplary embodiment of this application, the apparatus is connected to a physical aiming component, and the apparatus may be applicable to a computer device. The apparatus includes:

a display module 1310, configured to display a user interface (UI) of an application program, the UI including a virtual environment picture, and the virtual environment picture being a picture obtained by observing the three-dimensional virtual environment from the perspective of a third-person point of view;

a receiving module 1320, configured to receive an aiming operation on the physical aiming component, the aiming operation including a first operating position and a second operating position that are on the physical aiming component, the first operating position being an initial operating position of the aiming operation, and the second operating position being a current operating position of the aiming operation; and the display module 1310 being further configured to display a three-dimensional ability aiming indicator in the virtual environment picture in response to the aiming operation, an ability aiming direction of the three-dimensional ability aiming indicator being parallel to an aiming direction of the aiming operation in the UI, and the aiming direction being a direction pointing from the first operating position to the second operating position.

In an embodiment, the display module 1310 includes a determining submodule 1312 and a display submodule 1314.

The determining submodule 1312 is configured to determine, in response to the aiming operation and according to an aiming vector pointing from the first operating position to the second operating position, an ability aiming vector of the three-dimensional ability aiming indicator in the three-dimensional virtual environment; and the display submodule 1314 is further configured to display the three-dimensional ability aiming indicator according to the ability aiming vector.

In an embodiment, the determining submodule 1312 includes:

a determining subunit 1312-a, configured to determine the aiming vector pointing from the first operating position to the second operating position;

a calculation subunit 1312-b, configured to calculate, by using a center point on the UI as a first reference position, a pointed second reference position after the first reference position and the aiming vector are added;

a conversion subunit 1312-c, configured to convert the first reference position into a third reference position in the three-dimensional virtual environment by using an inverse transformation matrix, and convert the second reference position into a fourth reference position in the three-dimensional virtual environment by using the inverse transformation matrix; and the determining subunit 1312-a being further configured to determine a vector pointing from the third reference position to the fourth reference position as the ability aiming vector of the three-dimensional ability aiming indicator in the three-dimensional virtual environment.

In an embodiment, the ability aiming control includes a maximum aiming distance, and there is a first ratio of a first distance between the first operating position and the second operating position to the maximum aiming distance; and the ability includes a maximum ability distance in the three-dimensional virtual environment, the three-dimensional ability aiming indicator includes a first aiming position and a second aiming position that are in the three-dimensional virtual environment, the first aiming position is an initial point during ability aiming, the second aiming position is a target point during ability aiming, and there is a second ratio of a second distance between the first aiming position and the second aiming position to the maximum ability distance, the first ratio and the second ratio being the same.

In an embodiment, the display submodule 1314 is further configured to determine a position point of the virtual character in the three-dimensional virtual environment as the first aiming position; determine the second aiming position of the three-dimensional ability aiming indicator during ability aiming according to the first aiming position and the ability aiming vector; and display the three-dimensional ability aiming indicator according to the first aiming position and the second aiming position.

In an embodiment, the display submodule 1314 is further configured to obtain a maximum aiming distance of the physical aiming component, and calculate the first ratio of the first distance between the first operating position and the second operating position to the maximum aiming distance;

the display submodule 1314 is further configured to obtain the maximum ability distance of the ability in the three-dimensional virtual environment, and calculate a product of the first ratio and the maximum ability distance as a cast distance; and the display submodule 1314 is further configured to add, in a direction pointed by the aiming vector, the first aiming position to the cast distance, to obtain the second aiming position of the three-dimensional ability aiming indicator during ability aiming.

In an embodiment, the display module 1310 is further configured to display the three-dimensional ability aiming indicator in the virtual environment picture in response to that a distance between the first operating position and the second operating position is greater than a dead region threshold.

Based on the above, according to the apparatus provided in this embodiment, by determining the first reference position, the second reference position, and the third reference position and the fourth reference position that are in the virtual environment and obtained through the inverse transformation matrix, the vector pointing from the third reference position to the fourth reference position is determined as the ability direction of the three-dimensional ability aiming indicator in the virtual environment. Finally, the ability aiming direction of the three-dimensional ability aiming indicator displayed in the virtual environment picture is caused to be parallel to the aiming direction of the aiming operation through mapping. The first ratio of the first distance between the first operating position and the second operating position to the maximum aiming distance, and the product of the first ratio and the maximum ability distance is calculated as the cast distance. In this way, the cast distance of the virtual character is determined according to the distance between the first operating position and the second operating position of the aiming operation of the user, thereby improving the human-computer interaction efficiency.

Figure 21:
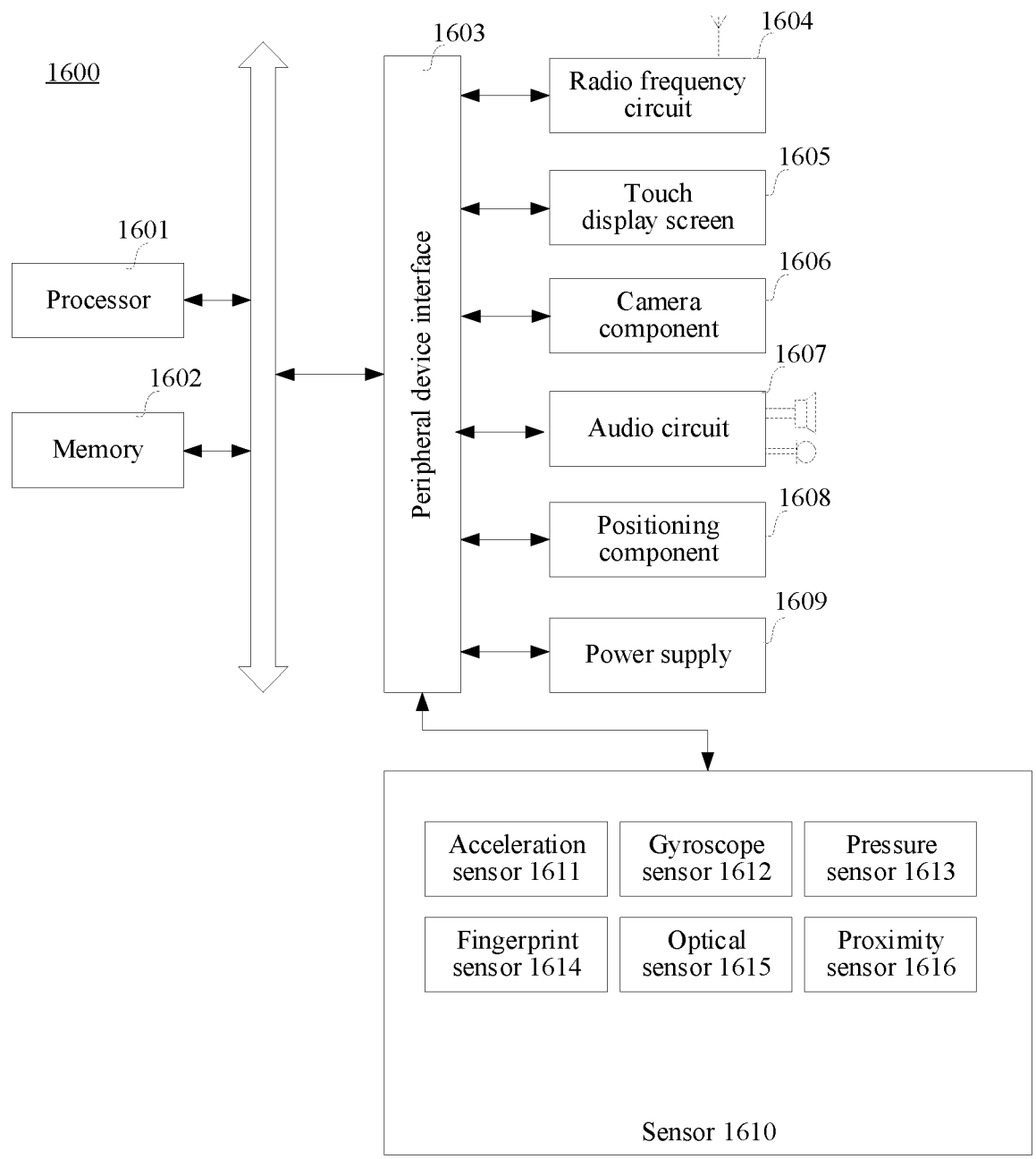
FIG. 21 is a schematic structural diagram of a computer device according to an exemplary embodiment of this application.

FIG. 21 is a schematic structural diagram of a computer device according to an exemplary embodiment of this application. The computer device 1600 may be a terminal, such as a smartphone, a tablet computer, an MP3 player, or an MP4 player. The computer device 1600 may be further referred to as another name such as user equipment or a portable terminal.

Generally, the computer device 1600 includes a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is a processor configured to process data in an active state, also referred to as a central processing unit (CPU). The coprocessor is a low-power processor configured to process data in a standby state. In some embodiments, the processor 1601 may be integrated with a graphics processing unit (GPU). The GPU is configured to render and draw content that needs to be displayed on a display screen. In some embodiments, the processor 1601 may further include an artificial intelligence (AI) processor. The AI processor is configured to process computing operations related to machine learning.

The memory 1602 may include one or more computer-readable storage media. The computer-readable storage medium may be tangible and non-transient. The memory 1602 may further include a high-speed random access memory and a non-volatile memory, for example, one or more magnetic disk storage devices or flash memory devices. In some embodiments, a non-transitory computer-readable storage medium in the memory 1602 is configured to store at least one instruction, the at least one instruction being configured to be executed by the processor 1601 to implement the method provided in this application.

In some embodiments, the electronic device 1600 may optionally include: a peripheral device interface 1603 and at least one peripheral device. Specifically, the peripheral device includes: at least one of a radio frequency (RF) circuit 1604, a touch display screen 1605, a camera component 1606, an audio circuit 1607, a positioning component 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on the same chip or circuit board. In some other embodiments, any one or two of the processor 1601, the memory 1602, and the peripheral device interface 1603 may be implemented on a separate chip or circuit board, which is not limited in this embodiment.

The RF circuit 1604 is configured to receive and transmit an RF signal, which is also referred to as an electromagnetic signal. The RF circuit 1604 communicates with a communication network and other communication devices through the electromagnetic signal. The RF circuit 1604 converts an electrical signal into an electromagnetic signal for transmission, or converts a received electromagnetic signal into an electrical signal. Optionally, the RF circuit 1604 includes: an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1604 may further include a circuit related to near field communication (NFC), which is not limited in this application.

The touch display screen 1605 is configured to display a user interface (UI). The UI may include a graph, text, an icon, a video, and any combination thereof. The touch display screen 1605 also has a capability of acquiring a touch signal on or above a surface of the touch display screen 1605. The touch signal may be used as a control signal to be inputted to the processor 1601 for processing. The touch display screen 1605 is configured to provide a virtual button and/or a virtual keyboard, which is also referred to as a soft button and/or a soft keyboard. In some embodiments, there may be one touch display screen 1605, disposed on a front panel of the electronic device 1600. In some other embodiments, there may be at least two touch display screens 1605, respectively disposed on different surfaces of the electronic device 1600 or designed in a foldable shape. In still some other embodiments, the touch display screen 1605 may be a flexible display screen, disposed on a curved surface or a folded surface of the electronic device 1600. Even, the touch display screen 1605 may be further set in a non-rectangular irregular pattern, namely, a special-shaped screen. The touch display screen 1605 may be made of a material such as a liquid crystal display (LCD) or an organic light-emitting diode (OLED).

The camera component 1606 is configured to acquire an image or a video. Optionally, the camera component 1606 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and virtual reality (VR) shooting functions by fusing the main camera and the wide-angle camera. In some embodiments, the camera component 1606 may further include a flash. The flash may be a single color temperature flash or a double color temperature flash. The double color temperature flash refers to a combination of a warm light flash and a cold light flash, and may be used for light compensation under different color temperatures.

The audio circuit 1607 is configured to provide an audio interface between a user and the electronic device 1600. The audio circuit 1607 may include a microphone and a speaker. The microphone is configured to acquire sound waves of a user and an environment, and convert the sound waves into an electrical signal to input to the processor 1601 for processing, or input to the RF circuit 1604 for implementing voice communication. For the purpose of stereo sound acquisition or noise reduction, there may be a plurality of microphones, respectively disposed at different parts of the electronic device 1600. The microphone may be further an array microphone or an omnidirectional acquisition microphone. The speaker is configured to convert electrical signals from the processor 1601 or the RF circuit 1604 into sound waves. The speaker may be a conventional film speaker, or may be a piezoelectric ceramic speaker. When the speaker is a piezoelectric ceramic speaker, the speaker can not only convert an electrical signal into sound waves audible to a human being, but also convert an electrical signal into sound waves inaudible to the human being for ranging and other purposes. In some embodiments, the audio circuit 1607 may also include an earphone jack.

The positioning component 1608 is configured to position a current geographic location of the electronic device 1600, to implement a navigation or a location based service (LBS). The positioning component 1608 may be a positioning component based on the Global Positioning System (GPS) of the United States, the BeiDou System of China, and the GLONASS System of Russia.

The power supply 1609 is configured to supply power to components in the electronic device 1600. The power supply 1609 may be an alternating current, a direct current, a primary battery, or a rechargeable battery. When the power supply 1609 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may further be configured to support a quick charge technology.

In some embodiments, the electronic device 1600 may also include one or more sensors 1610. The one or more sensors 1610 include, but are not limited to: an acceleration sensor 1611, a gyroscope sensor 1612, a pressure sensor 1613, a fingerprint sensor 1614, an optical sensor 1615, and a proximity sensor 1616.

The acceleration sensor 1611 may detect acceleration on three coordinate axes of a coordinate system established by the electronic device 1600. For example, the acceleration sensor 1611 may be configured to detect components of gravity acceleration on the three coordinate axes. The processor 1601 may control, according to a gravity acceleration signal acquired by the acceleration sensor 1611, the touch display screen 1605 to display the user interface in a frame view or a portrait view. The acceleration sensor 1611 may be further configured to acquire motion data of a game or a user.

The gyroscope sensor 1612 may detect a body direction and a rotation angle of the electronic device 1600. The gyroscope sensor 1612 may cooperate with the acceleration sensor 1611 to acquire a 3D action performed by the user on the electronic device 1600. The processor 1601 may implement the following functions according to data acquired by the gyroscope sensor 1612: motion sensing (for example, the UI is changed according to a tilt operation of a user), image stabilization during shooting, game control, and inertial navigation.

The pressure sensor 1613 may be disposed on a side frame of the electronic device 1600 and/or a lower layer of the touch display screen 1605. When the pressure sensor 1613 is disposed at the side frame of the electronic device 1600, a holding signal of the user on the electronic device 1600 may be detected, and left/right hand identification and a quick operation may be performed according to the holding signal. When the pressure sensor 1613 is disposed at the lower layer of the touch display screen 1605, an operable control on the UI interface can be controlled according to a pressure operation of the user on the touch display screen 1605. The operable control includes at least one of a button control, a scroll-bar control, an icon control, and a menu control.

The fingerprint sensor 1614 is configured to acquire a fingerprint of a user to identify the identity of the user according to the acquired fingerprint. When identifying that the identity of the user is a trusted identity, the processor 1601 authorizes the user to perform related sensitive operations. The sensitive operations include: unlocking a screen, viewing encrypted information, downloading software, payment, setting changing, and the like. The fingerprint sensor 1614 may be disposed on a front face, a rear face, or a side face of the electronic device 1600. In a case that a physical button or a vendor logo is disposed on the electronic device 1600, the fingerprint sensor 1614 may be integrated together with the physical button or the vendor logo.

The optical sensor 1615 is configured to acquire ambient light intensity. In an embodiment, the processor 1601 may control the display brightness of the touch display screen 1605 according to the ambient light intensity acquired by the optical sensor 1615. Specifically, when the ambient light intensity is relatively high, the display brightness of the touch display screen 1605 is increased; and when the ambient light intensity is relatively low, the display brightness of the touch display screen 1605 is reduced. In another embodiment, the processor 1601 may further dynamically adjust a camera parameter of the camera component 1606 according to the ambient light intensity acquired by the optical sensor 1615.

The proximity sensor 1616, also referred to as a distance sensor, is generally disposed on the front surface of the electronic device 1600. The proximity sensor 1616 is configured to acquire a distance between the user and the front face of the electronic device 1600. In an embodiment, when the proximity sensor 1616 detects that the distance between the user and the front surface of the electronic device 1600 becomes smaller, the touch display screen 1605 is controlled by the processor 1601 to switch from a screen-on state to a screen-off state. When the proximity sensor 1616 detects that the distance between the user and the front surface of the electronic device 1600 becomes larger, the touch display screen 1605 is controlled by the processor 1601 to switch from the screen-off state to the screen-on state.

A person skilled in the art may understand that a structure shown in FIG. 21 constitutes no limitation on the electronic device 1600, and the electronic device may include more or fewer components than those shown in the figure, or some components may be combined, or a different component deployment may be used.

This application further provides a computer-readable storage medium, storing at least one instruction, at least one program, a code set, or an instruction set, the at least one instruction, the at least one program, the code set, or the instruction set being loaded and executed by a processor to implement the ability aiming method in a three-dimensional virtual environment provided in the foregoing method embodiments.

This application further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the ability aiming method in a three-dimensional virtual environment provided in the foregoing method embodiments.

It is to be understood that "plurality of" mentioned in this specification means two or more. And/or describes an association relationship between associated objects and means that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the embodiments may be implemented by hardware or a program instructing relevant hardware. The program may be stored in a computer readable storage medium. The storage medium may be a read-only memory, a magnetic disk, or an optical disc.

The foregoing descriptions are merely embodiments of this application, but are not intended to limit this application. Any modification, equivalent replacement, or improvement made within the spirit and principle of this application shall fall within the protection scope of this application.

What is claimed is:

1. An ability aiming method in a three-dimensional virtual environment performed by a computer device, the method comprising:
    displaying a user interface (UI) of an application program, the UI comprising a virtual environment picture and an ability aiming control, the virtual environment picture being a picture obtained by observing the three-dimensional virtual environment from the perspective of a third-person point of view, the ability aiming control being a two-dimensional control configured to cast an ability, and the ability aiming control being located on an upper layer of the virtual environment picture;
    receiving a drag operation on the ability aiming control, the drag operation comprising a first operating point and a second operating point that are located on the ability aiming control, the first operating point being an initial operating point of the drag operation, and the second operating point being a current operating point of the drag operation; and
    in response to receiving the drag operation on the ability aiming control:
        displaying a three-dimensional ability aiming indicator in the virtual environment picture, the three-dimensional ability aiming indicator having an ability aiming direction that is parallel to a drag direction of the drag operation in the UI, the drag direction corresponding to an aiming vector on the ability aiming control and pointing from the first operating point to the second operating point;
        determining an ability aiming vector in the three-dimensional virtual environment picture, corresponding to an aiming vector on the ability aiming control, according to an inverse transformation matrix; and
        casting a first ability to a target position in the virtual environment picture according to the ability aiming vector.

2. The method according to claim 1, further comprising:
    displaying the three-dimensional ability aiming indicator in the three-dimensional virtual environment.

3. The method according to claim 1, wherein determining the ability aiming vector further comprises:
    determining the aiming vector pointing from the first operating point to the second operating point;
    calculating, by using a center point on the UI as a first reference point, a pointed second reference point after the first reference point and the aiming vector are added;
    converting the first reference point into a third reference point in the three-dimensional virtual environment by using the inverse transformation matrix, and converting the second reference point into a fourth reference point in the three-dimensional virtual environment by using the inverse transformation matrix; and
    determining a vector pointing from the third reference point to the fourth reference point as the ability aiming vector.

4. The method according to claim 1, wherein:
    the ability aiming control comprises a maximum aiming distance, and there is a first ratio of a first distance between the first operating point and the second operating point to the maximum aiming distance; and
    the ability comprises a maximum ability distance in the three-dimensional virtual environment, the three-dimensional ability aiming indicator comprises a first aiming point and a second aiming point that are in the three-dimensional virtual environment, the first aiming point is an initial point during ability aiming, the second aiming point is a target point during ability aiming, and there is a second ratio of a second distance between the first aiming point and the second aiming point to the maximum ability distance, the first ratio and the second ratio being the same.

5. The method according to claim 4, wherein the three-dimensional virtual environment comprises a controlled virtual character, and displaying the three-dimensional ability aiming indicator comprises:

determining a position point of the virtual character in the three-dimensional virtual environment as the first aiming point;

determining the second aiming point of the three-dimensional ability aiming indicator during ability aiming according to the first aiming point and the ability aiming vector; and displaying the three-dimensional ability aiming indicator according to the first aiming point and the second aiming point.

6. The method according to claim 5, wherein the determining the second aiming point of the three-dimensional ability aiming indicator during ability aiming according to the first aiming point and the ability aiming vector comprises:

obtaining the maximum aiming distance of the ability aiming control;

calculating the first ratio of the first distance between the first operating point and the second operating point to the maximum aiming distance;

obtaining the maximum ability distance of the ability in the three-dimensional virtual environment; calculating a product of the first ratio and the maximum ability distance as a cast distance; and adding, in a direction pointed by the aiming vector, the first aiming point to the cast distance, to obtain the second aiming point of the three-dimensional ability aiming indicator during ability aiming.

7. The method according to claim 1, wherein displaying the three-dimensional ability aiming indicator in the virtual environment picture comprises:

displaying the three-dimensional ability aiming indicator in the virtual environment picture in response to a determination that a distance between the first operating point and the second operating point is greater than a dead region threshold.

8. A computer device, comprising a processor and a memory, the memory storing at least one program, the at least one program being loaded and executed by the processor to perform a plurality of operations including:

displaying a user interface (UI) of an application program, the UI comprising a virtual environment picture and an ability aiming control, the virtual environment picture being a picture obtained by observing a three-dimensional virtual environment from the perspective of a third-person point of view, the ability aiming control being a two-dimensional control configured to cast an ability, and the ability aiming control being located on an upper layer of the virtual environment picture;

receiving a drag operation on the ability aiming control, the drag operation comprising a first operating point and a second operating point that are located on the ability aiming control, the first operating point being an initial operating point of the drag operation, and the second operating point being a current operating point of the drag operation; and in response to receiving the drag operation on the ability aiming control:

displaying a three-dimensional ability aiming indicator in the virtual environment picture, the three-dimensional ability aiming indicator having an ability aiming direction that is parallel to a drag direction of the drag operation in the UI, the drag direction corresponding to an aiming vector on the ability aiming control and pointing from the first operating point to the second operating point;

determining an ability aiming vector in the three-dimensional virtual environment picture, corresponding to an aiming vector on the ability aiming control, according to an inverse transformation matrix; and casting a first ability to a target position in the virtual environment picture according to the ability aiming vector.

9. The computer device according to claim 8, the plurality of operations further including:

displaying the three-dimensional ability aiming indicator in the three-dimensional virtual environment.

10. The computer device according to claim 8, wherein the ability aiming vector further comprises:

determining the aiming vector pointing from the first operating point to the second operating point;

calculating, by using a center point on the UI as a first reference point, a pointed second reference point after the first reference point and the aiming vector are added;

converting the first reference point into a third reference point in the three-dimensional virtual environment by using the inverse transformation matrix, and converting the second reference point into a fourth reference point in the three-dimensional virtual environment by using the inverse transformation matrix; and determining a vector pointing from the third reference point to the fourth reference point as the ability aiming vector.

11. The computer device according to claim 8, wherein:

the ability aiming control comprises a maximum aiming distance, and there is a first ratio of a first distance between the first operating point and the second operating point to the maximum aiming distance; and the ability comprises a maximum ability distance in the three-dimensional virtual environment, the three-dimensional ability aiming indicator comprises a first aiming point and a second aiming point that are in the three-dimensional virtual environment, the first aiming point is an initial point during ability aiming, the second aiming point is a target point during ability aiming, and there is a second ratio of a second distance between the first aiming point and the second aiming point to the maximum ability distance, the first ratio and the second ratio being the same.

12. The computer device according to claim 11, wherein the three-dimensional virtual environment comprises a controlled virtual character, and displaying the three-dimensional ability aiming indicator comprises:

determining a position point of the virtual character in the three-dimensional virtual environment as the first aiming point;

determining the second aiming point of the three-dimensional ability aiming indicator during ability aiming according to the first aiming point and the ability aiming vector; and displaying the three-dimensional ability aiming indicator according to the first aiming point and the second aiming point.

13. The computer device according to claim 12, wherein the determining the second aiming point of the three-dimensional ability aiming indicator during ability aiming according to the first aiming point and the ability aiming vector comprises:

obtaining the maximum aiming distance of the ability aiming control; calculating the first ratio of the first distance between the first operating point and the second operating point to the maximum aiming distance;

obtaining the maximum ability distance of the ability in the three-dimensional virtual environment; calculating a product of the first ratio and the maximum ability distance as a cast distance; and adding, in a direction pointed by the aiming vector, the first aiming point to the cast distance, to obtain the second aiming point of the three-dimensional ability aiming indicator during ability aiming.

14. The computer device according to claim 8, wherein [the] displaying the three-dimensional ability aiming indicator in the virtual environment picture comprises:

displaying the three-dimensional ability aiming indicator in the virtual environment picture in response to a determination that a distance between the first operating point and the second operating point is greater than a dead region threshold.

15. A non-transitory computer-readable storage medium, storing at least one program, the at least one program being loaded and executed by a processor of a computer device to perform a plurality of operations including:

displaying a user interface (UI) of an application program, the UI comprising a virtual environment picture and an ability aiming control, the virtual environment picture being a picture obtained by observing a three-dimensional virtual environment from the perspective of a third-person point of view, the ability aiming control being a two-dimensional control configured to cast an ability, and the ability aiming control being located on an upper layer of the virtual environment picture;

receiving a drag operation on the ability aiming control, the drag operation comprising a first operating point and a second operating point that are located on the ability aiming control, the first operating point being an initial operating point of the drag operation, and the second operating point being a current operating point of the drag operation; and in response to receiving the drag operation on the ability aiming control:

displaying a three-dimensional ability aiming indicator in the virtual environment picture, the three-dimensional ability aiming indicator having an ability aiming direction that is parallel to a drag direction of the drag operation in the UI, the drag direction corresponding to an aiming vector on the ability aiming control and pointing from the first operating point to the second operating point;

determining an ability aiming vector in the three-dimensional virtual environment picture, corresponding to an aiming vector on the ability aiming control, according to an inverse transformation matrix; and casting a first ability to a target position in the virtual environment picture according to the ability aiming vector.

16. The non-transitory computer-readable storage medium according to claim 15, the plurality of operations further comprising:

displaying the three-dimensional ability aiming indicator in the three-dimensional virtual environment.

17. The non-transitory computer-readable storage medium according to claim 15, wherein determining, the ability aiming vector further comprises:

determining the aiming vector pointing from the first operating point to the second operating point;

calculating, by using a center point on the UI as a first reference point, a pointed second reference point after the first reference point and the aiming vector are added;

converting the first reference point into a third reference point in the three-dimensional virtual environment by using the inverse transformation matrix, and converting the second reference point into a fourth reference point in the three-dimensional virtual environment by using the inverse transformation matrix; and determining a vector pointing from the third reference point to the fourth reference point as the ability aiming vector.

18. The non-transitory computer-readable storage medium according to claim 15, wherein;

the ability aiming control comprises a maximum aiming distance, and there is a first ratio of a first distance between the first operating point and the second operating point to the maximum aiming distance; and the ability comprises a maximum ability distance in the three-dimensional virtual environment, the three-dimensional ability aiming indicator comprises a first aiming point and a second aiming point that are in the three-dimensional virtual environment, the first aiming point is an initial point during ability aiming, the second aiming point is a target point during ability aiming, and there is a second ratio of a second distance between the first aiming point and the second aiming point to the maximum ability distance, the first ratio and the second ratio being the same.

19. The non-transitory computer-readable storage medium according to claim 18, wherein the three-dimensional virtual environment comprises a controlled virtual character, and displaying the three-dimensional ability aiming indicator comprises:

determining a position point of the virtual character in the three-dimensional virtual environment as the first aiming point;

determining the second aiming point of the three-dimensional ability aiming indicator during ability aiming according to the first aiming point and the ability aiming vector; and displaying the three-dimensional ability aiming indicator according to the first aiming point and the second aiming point.

20. The non-transitory computer-readable storage medium according to claim 15, wherein displaying a three-dimensional ability aiming indicator in the virtual environment picture comprises:

displaying the three-dimensional ability aiming indicator in the virtual environment picture in response to a determination that a distance between the first operating point and the second operating point is greater than a dead region threshold.

* * * * *